United States Patent
Niesen

(10) Patent No.: US 12,554,024 B2
(45) Date of Patent: Feb. 17, 2026

(54) MAP-AIDED SATELLITE SELECTION

(71) Applicant: QUALCOMM Incorporated, San Diego, CA (US)

(72) Inventor: Urs Niesen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/186,410

(22) Filed: Feb. 26, 2021

(65) Prior Publication Data
US 2022/0276394 A1 Sep. 1, 2022

(51) Int. Cl.
*G01S 19/47* (2010.01)

(52) U.S. Cl.
CPC .................................. *G01S 19/47* (2013.01)

(58) Field of Classification Search
CPC ........... G01S 19/47; G01S 19/38; G01S 19/39
See application file for complete search history.

(56) References Cited

U.S. PATENT DOCUMENTS

| | | | | |
|---|---|---|---|---|
| 5,629,855 A | * | 5/1997 | Kyrtsos | G05D 1/0272 342/450 |
| 2012/0059578 A1 | * | 3/2012 | Venkatraman | G01S 19/396 701/411 |
| 2014/0070991 A1 | * | 3/2014 | Liu | G01S 19/428 342/357.63 |
| 2014/0266873 A1 | * | 9/2014 | Pighin | G01S 19/073 342/357.42 |
| 2017/0092015 A1 | * | 3/2017 | McCann | G06T 19/20 |
| 2021/0234607 A1 | * | 7/2021 | Kaufman | H04B 7/18539 |
| 2021/0258834 A1 | * | 8/2021 | Pastuszak | H04W 4/42 |
| 2021/0404829 A1 | * | 12/2021 | St. Romain | G08G 1/0129 |

* cited by examiner

*Primary Examiner* — Jason Holloway
*Assistant Examiner* — Christopher A Buksa
(74) *Attorney, Agent, or Firm* — Thien T. Nguyen

(57) ABSTRACT

Techniques for map-aided satellite selection are provided. An example of a method for determining a location according to the disclosure includes determining a future trajectory of a user equipment, estimating an environment model associated with the future trajectory, determining a plurality of expected navigation satellites based on the future trajectory and the environment model, selecting a set of navigation satellites to use in computing the current location based in part on the plurality of expected navigation satellites, and computing the current location based on the selected set of navigation satellites.

30 Claims, 18 Drawing Sheets

MAP-AIDED SATELLITE SELECTION

FIELD

The subject matter disclosed herein relates generally to satellite based positioning systems, and in particular, to systems and methods for selecting a subset of satellites to be used for locating a Global Navigation Satellite System (GNSS) receiver.

BACKGROUND

The Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may collectively be known as ephemeris information.

GPS signals are formed of a navigation message binary phase shift modulated (BPSK) onto a direct sequence spread spectrum signal. The spread spectrum signal comprises a unique pseudo-noise (PN) code that identifies the satellite. For civil application GPS signals transmitted using the L1 frequency, this code is known as the C/A code. The C/A code has a sequence length of 1023 chips and it is spread with a 1.023 MHz chipping rate. The code sequence therefore repeats every millisecond. The code sequence has an identified start instant when the two code generators in the satellite just transition to the all '1's' state. This instant is known as the code epoch. After various transport delays in the satellite, the code epoch is broadcast through the timing and sequence of specific code states assigned to the satellite. This signaling event can be recognized, in suitably adapted receivers, through a process of aligning a replica code with the code received from each satellite.

The navigation message has a data rate of 50 bits per second, lower than the code rate, and its data bit or symbol transitions are synchronized with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

In addition to the time and ephemeris information, the data message also contains the satellite constellation almanac, parameters representing the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, is periodically refreshed by the GPS Control Segment, typically every 2 hours, so that the navigation data message is representative of the orbit and status of each satellite. There are indicators in the navigation message which provide the user with knowledge of when the ephemeris and clock data has been changed. Details of these changes are set out in the GPS interface standard, IS GPS 200.

In general, a GPS receiver may determine the time-of-arrival of a signaling event through a process of aligning a replica code with the code received from each satellite. The receiver may also use the TOW information contained in the navigation message to determine the time when the signaling event was transmitted. From this, the receiver can determine the transit time for the signaling event (from which it can determine the distance between it and the satellite), together with the position of the satellite at the time when the signaling event was transmitted (using the ephemeris information). The receiver can then calculate its own position. Theoretically, the position of the GPS receiver can be determined using signals from three satellites, providing the receiver has a precise time or knowledge of part of the positions, such as altitude. However, in practice GPS receivers use signals from four or more satellites to determine an accurate three-dimensional location solution because an offset between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signaling event was transmitted. Under weak signal conditions or briefly glimpsed signals, the receiver may also be unable to recognize the start of a sub-frame since it may not be able to decode the TLM.

A receiver that has been unable to decode the TLM and TOW information in the navigation message may nonetheless be able to deduce some timing information even under weak signal conditions or from briefly glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents a fractional part of the signal transit time between satellite and the receiver, measured in code repetition intervals. The integer number of code repetition intervals the signal took to travel between the satellite and the receiver cannot be measured by the receiver (e.g., integer ambiguity value).

GNSS accuracy may degrade significantly under weak signal conditions such as when the line-of-sight (LOS) to the satellite vehicles is obstructed by natural or manmade objects. In natural or urban canyons, for example, limitations on visible satellites and other multipath effects may induce an absolute position error of the order of tens of meters (e.g. as much as 50 meters) and relative position error of the order several meters. In addition, accuracy may be further degraded by the limited availability of good GNSS measurements. For example, with GNSS measurements that use carrier phase to achieve higher accuracy, positioning accuracy is dependent on a constant lock obtained by maintaining a clear view to at least four satellites, which may not be possible due to environmental conditions (e.g. in urban canyons).

SUMMARY

An example of a method for determining a current location with a user equipment according to the disclosure includes determining a future trajectory of the user equipment, estimating an environment model associated with the future trajectory, determining a plurality of expected navigation satellites based on the future trajectory and the environment model, selecting a set of navigation satellites to use in computing the current location based in part on the plurality of expected navigation satellites, and computing the current location based on the selected set of navigation satellites.

Implementations of such a method may include one or more of the following features. Estimating the environment model may include obtaining map data associated with the future trajectory from memory. Estimating the environment model may include obtaining map data associated with the future trajectory from a server. Estimating the environment model may include obtaining one or more images of objects along the future trajectory and solving a structure-from-motion problem to reconstruct a three-dimensional environment model. Determining the future trajectory of the user equipment may include obtaining a current velocity and a current heading of the user equipment. Determining the future trajectory of the user equipment may include obtaining map data associated with the future trajectory and combining a current velocity of the user equipment with the map data. Determining the future trajectory of the user equipment may include obtaining the future trajectory from a path planning module of an autonomously driving vehicle. The method may further include detecting a plurality of current navigation satellites with the user equipment and selecting the set of navigation satellites to use in computing the current location based in part on the plurality of current navigation satellites and the plurality of expected navigation satellites. Selecting the set of navigation satellites to use in computing the current location may include selecting one or more navigation satellites that will not be obstructed for at least a portion of the future trajectory. Selecting the set of navigation satellites to use in computing the current location may include selecting one or more navigation satellites vehicles that will not be obstructed for a significant majority of the future trajectory. An integer ambiguity value for each of the navigation satellites in the set of navigation satellites to use in computing the current location may be stored in a navigation filter in the user equipment.

An example of a navigation device according to the disclosure, includes a memory, a global navigation satellite system receiver, at least one processor operably coupled to the memory and the global navigation satellite system receiver and configured to determine a future trajectory of the navigation device, estimate an environment model associated with the future trajectory, determine a plurality of expected navigation satellites based on the future trajectory and the environment model, select a set of navigation satellites to use in computing a current location based in part on the plurality of expected navigation satellites, and compute the current location based on signal received by the global navigation satellite system receiver received from the set of navigation satellites.

Implementations of such a navigation device may include one or more of the following features. The at least one processor may be configured to obtain map data associated with the future trajectory from the memory to estimate the environment model. At least one transceiver may be operably coupled to the at least one processor and configured to communicate with a wireless network, such that the at least one processor is configured to obtain map data associated with the future trajectory from a server to estimate the environment model. A camera may be operably coupled to the at least one processor and configured to obtain one or more images of objects along the future trajectory, and the at least one processor may be further configured to solve a structure-from-motion problem based in part on the one or more images of objects obtained by the camera, such that estimating the environment model includes a solution to the structure-from-motion problem. An inertial measurement unit may be operably coupled to the at least one processor and configured to detect a velocity measurement and a heading measurement, such that the at least one processor is configured to obtain a current velocity and a current heading from the inertial measurement unit to determine the future trajectory of the navigation device. The at least one processor may be configured to determine the future trajectory of the navigation device by combining the current velocity with map data stored in the memory. The at least one processor may be configured to determine the future trajectory of the navigation device by obtaining the future trajectory from a path planning module of an autonomously driving vehicle. The global navigation satellite system receiver may be configured to detect a plurality of current navigation satellites, and the at least one processor may be further configured to select the set of navigation satellites to use in computing the current location based on part on the plurality of current navigation satellites and the plurality of expected navigation satellites. The at least one processor may be configured to determine the set of navigation satellites to use in computing the current location by determining one or more navigation satellites that will not be obstructed for at least a portion of the future trajectory. The at least one processor may be configured to determine the set of navigation satellites to use in computing the current location by determining one or more navigation satellites that will not be obstructed for a significant majority of the future trajectory. The global navigation satellite system receiver may be configured to store an integer ambiguity value for each of the navigation satellites in the set of navigation satellites to use in computing the current location in a navigation filter.

An example of an apparatus for determining a current location according to the disclosure includes means for determining a future trajectory of the apparatus, means for estimating an environment model associated with the future trajectory, means for determining a plurality of expected navigation satellites based on the future trajectory and the environment model, means for selecting a set of navigation satellites to use in computing the current location based in part on the plurality of expected navigation satellites, and means computing the current location based on the selected set of navigation satellites.

Implementations of such an apparatus may include one or more of the following features. The means for estimating the environment model may include means for obtaining map data associated with the future trajectory from memory. The means for estimating the environment model may include means for obtaining map data associated with the future trajectory from a server. The means for estimating the environment model may include means for obtaining one or more images of objects along the future trajectory and means for solving a structure-from-motion problem to reconstruct a three-dimensional environment model. The means for determining the future trajectory of the apparatus may include means for obtaining map data associated with the future trajectory and means for combining a current velocity of the apparatus with the map data. The means for determining the future trajectory of the apparatus may include means for obtaining the future trajectory from a path planning module of an autonomously driving vehicle. Selecting the set of navigation satellites to use in computing the current location may include selecting one or more navigation satellites that will not be obstructed for at least a portion of the future trajectory.

An example of a non-transitory processor-readable storage medium comprising computer-readable instructions configured to cause one or more processors to determine a current location with a user equipment according to the disclosure includes code for determining a future trajectory of the user equipment, code for estimating an environment model associated with the future trajectory, code for determining a plurality of expected navigation satellites based on the future trajectory and the environment model, code for selecting a set of navigation satellites to use in computing the current location based in part on the plurality of expected navigation satellites, and code for computing the current location based on the selected set of navigation satellites.

Items and/or techniques described herein may provide one or more of the following capabilities, as well as other capabilities not mentioned. A future trajectory of a GNSS system can be determined. The GNSS system may be included in user equipment and/or a vehicle. An estimate of the three-dimensional (3-D) environment model along the trajectory may be obtained. The 3-D environment may be based on map data. The 3-D environment may be estimated with a forward-facing camera. The 3-D environment may be estimated based on information received from a network resource. Based on the future 3-D environment and known satellite locations, a set of satellites that will be visible during the predicted vehicle trajectory may be computed. A set of the visible satellites can be tracked in the GNSS receiver navigation filter. Preference may be given to satellites that are continuously visible throughout the entire, or a significant majority, of the predicted trajectory. Accuracy of the GNSS positions may be increased. The filter size and corresponding computational load on the GNSS processors may be reduced. Power consumed by the GNSS receiver may be reduced. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
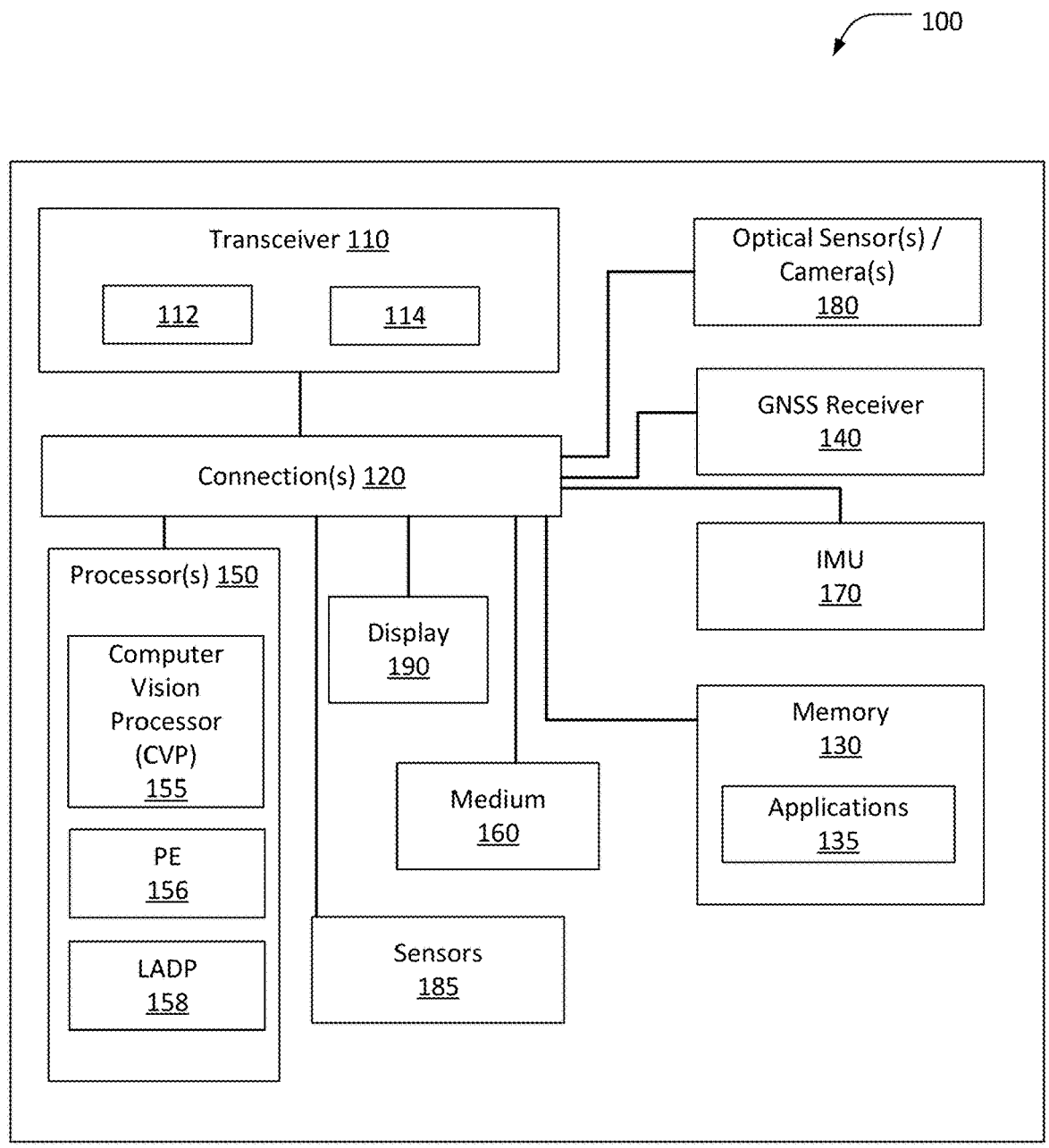
FIG. 1 is a schematic block diagram illustrating certain exemplary features of a User Equipment (UE) enabled to support position determination in accordance with disclosed embodiments.

Techniques are discussed herein for map-aided satellite selection. Modern GNSS receivers can measure signals from multiple satellite systems, such as the Global Positioning System (GPS), GLONASS, Galileo, and BeiDou. When all these systems are fully operational, a receiver may expect to see over 30 satellites in open-sky conditions. A standard GNSS receiver architecture generally uses a navigation filter to integrate satellite measurements across time. For example, extended Kalman filters are generally used in most receivers. The extended Kalman filters are configured to track the receiver position and velocity as well as other satellite information such as the integer ambiguities of each satellite. These ambiguities may either be left in float mode, or they may be fixed to an integer. In either solution, the number of integer ambiguities increases with the number of satellites being tracked, and thus increases the size of the Kalman filter state and the corresponding computational requirements of the receiver.

A GNSS receiver may implement satellite selection algorithms to reduce the computational requirements. In an example, the GNSS receiver may select a subset of the visible satellites to track in the receiver navigation filter. This selection may consider the signal SNR or the satellite elevation. Since the float integer ambiguities are better estimated for satellites that have been continuously tracked for longer, satellite time-in-track may also be a criterion.

The satellite selection criteria may make use of information about the past and present (e.g., the current signal SNR or the time-in-track). As described in more detail below, information about the future may also be used. A future trajectory of a GNSS equipped vehicle (i.e., the GNSS antenna) may be estimated based on various dead-reckoning or other navigational techniques. For example, the future position estimate may come from a path planning module if the vehicle is driving autonomously, or it may be estimated by combining the current velocity of the vehicle with map data. Information about the 3-D environment along the estimated future trajectory of the vehicle may be obtained from local or networked sources. For example, the 3-D environment information may be obtained from local or remote map data. In another example, the 3-D environment information may be estimated by using a forward-facing camera installed on the vehicle or navigation device (e.g., a smart phone). A structure-from-motion problem may be solved to reconstruct the 3-D environment. In another example, the 3-D environment data may be transmitted wirelessly from another vehicle at or close to the predicted location (i.e., a vehicle that is closer to the structures and thus potentially in a position to obtain a better 3-D reconstruction from its own camera). Based on the future 3-D environment and the known satellite locations, the GNSS system may be configured to compute which satellites will be visible during the predicted vehicle trajectory. This set of visible satellites may be further narrowed to determine which satellites to track in the GNSS receiver navigation filter by giving preference to those satellites that are continuously visible throughout the entire, or a significant majority, of the predicted vehicle trajectory. These techniques are examples and not exhaustive.

Referring to FIG. 1, a schematic block diagram illustrating certain exemplary features of a UE 100 enabled to support position determination in accordance with disclosed embodiments is shown. The terms "user equipment" (UE), "User Device" (UD), "mobile device", or "vehicle navigation system" are used interchangeably herein and may refer to a device such as a cellular or other wireless communication device, personal communication system (PCS) device, personal navigation device (PND), Personal Information Manager (PIM), Personal Digital Assistant (PDA), vehicle navigation system, laptop or other suitable mobile device which is capable of receiving wireless communication and/ or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer, laptop, a vehicle navigation system, or an autonomous vehicle which utilizes real time positioning. In addition, the terms UD, UE, "mobile station" "mobile device" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "user device."

The UE 100 is enabled to support positioning based on a combination of signals obtained with a global navigation satellite system receiver and sensor-based measurements to compute relative displacement, including camera or other image-based techniques. Further, in some embodiments, the UE 100 may also support hybrid GNSS positioning techniques by combining image-based techniques with GNSS carrier-phase signal measurements. The term "hybrid" is used to refer to the use of a combination of one or more of displacement sensor and/or camera-based techniques with GNSS signal based techniques to perform location determination in a manner consistent with embodiments disclosed herein. One or more processors 150 in the UE 100 may be a means for combining sensor data with map data.

The UE 100 may, for example, include one or more processors or processor(s) 150, memory 130, a transceiver 110 (e.g., wireless network interface), and Satellite Positioning System (SPS) receiver/GNSS receiver 140 (hereinafter "GNSS receiver 140") and optical sensors/camera(s) 180. In some embodiments, the UE 100 may also optionally or additionally include one or more of: a magnetometer, an altimeter, a barometer, and sensors 185 (collectively referred to as sensors 185). In some embodiments, the UE 100 may include an Inertial Measurement Unit (IMU) 170, non-transitory computer-readable medium 160, display 190, and memory 130, which may be operatively coupled to each other with one or more connections 120 (e.g., buses, lines, fibers, links, etc.). The memory 130 may include one or more applications 135 containing code configured to cause the processors 150 and other devices in the UE 100 to execute the processes described herein. In certain example implementations, all or part of the UE 100 may take the form of a chipset, and/or the like.

The GNSS receiver 140 may be enabled to receive signals associated with one or more SPS/GNSS resources. Received SPS/GNSS signals may be stored in memory 130 and/or used by processor(s) 150 to determine a position of UE the 100. In some embodiments, GNSS receiver 140 may include a code phase receiver and a carrier phase receiver, which may measure carrier wave related information. The carrier wave, which typically has a much higher frequency than the pseudo random noise (PRN) (code phase) sequence that it carries, may facilitate more accurate position determination. The term "code phase measurements" refer to measurements using a Coarse Acquisition (C/A) code receiver, which uses the information contained in the PRN sequence to calculate the position of the UE 100. The term "carrier phase measurements" refer to measurements using a carrier phase receiver, which uses the carrier signal to calculate positions. The carrier signal may take the form, for example for GPS, of the signal L1 at 1575.42 MHz (which carries both a status message and a pseudo-random code for timing) and the L2 signal at 1227.60 MHz (which carries a more precise military pseudo-random code).

In some embodiments, carrier phase measurements may be used to determine position in conjunction with code phase measurements and differential techniques, when GNSS signals that meet quality parameters are available. The use of carrier phase measurements along with differential correction can yield relative sub-decimeter position accuracy. In some embodiments, the UE 100 may use techniques based on or variants of real-time carrier phase differential GPS (CDGPS) to determine the position of the UE 100 at various point and times, when such measurements are available. The term "differential correction", as used conventionally, refers to corrections to carrier phase measurements determined by a reference station at a known location. The carrier phase measurements at the reference station may be used to estimate the residuals of (e.g. portions not corrected by navigation messages) satellite clock biases of visible satellites. The satellite clock biases are transmitted to "roving receivers" which use the received information to correct their respective measurements. In some embodiments, the position $p1$ of the UE 100 at time $t1$ may be considered as the "rover receiver" position, while the position p2 of the UE 100 at time t2 may be considered the as the "reference receiver" position and differential techniques may be applied to minimize or remove errors induced by satellite clock biases. Because the same receiver is used at time t1 and t2, no data needs to be actually transmitted from the "reference" receiver (i.e. receiver at time t1), to the "rover" receiver, (i.e. same receiver at time t2). In some embodiments, instead of the data transmission between rover and receiver that occurs in classical RTK, a local data buffering operation may be used to hold data at times t1 and t2.

The term "differential techniques" refers to techniques such as "single differencing", "double differencing" etc. where the qualifiers "single" "double" etc. refer traditionally to the number of satellites and the two receivers used in the differencing.

In general, "single differencing" refers to error reduction techniques that subtract GNSS carrier phase measurements at the UE 100 from a single satellite S at time t2 from GNSS carrier measurements at the UE 100 from same satellite S at time t1. The term "double differencing", as used in relation to embodiments described herein, refers to the carrier phase double difference observable between the times t1 and t2, which may be obtained as the difference between the above single difference carrier phase observable for a satellite S_i and the above single difference carrier phase observable for a satellite S_j.

The GNSS receiver 140 may be included in a mobile device, which in an embodiment, may be a vehicle, a mobile handset, laptop, computer, tablet, aerial vehicle or drone, or other GNSS-enabled mobile device.

The transceiver 110 may, for example, include a transmitter 112 enabled to transmit one or more signals over one or more types of wireless communication networks and a receiver 114 to receive one or more signals transmitted over one or more types of wireless communication networks. Wireless communication networks may include, for example, Wireless Wide Area Networks (WWAN), including cellular networks, and/or Wireless Local Area Networks (WLANs). In an embodiment, at least one transceiver 110 may be operably coupled to at least one processor 150 and configured to communicate with a wireless network, such that the at least one processor 150 is configured to obtain map data associated with a future trajectory of the UE 100 from a server to estimate an environment model associated with a future location.

Figure 8:
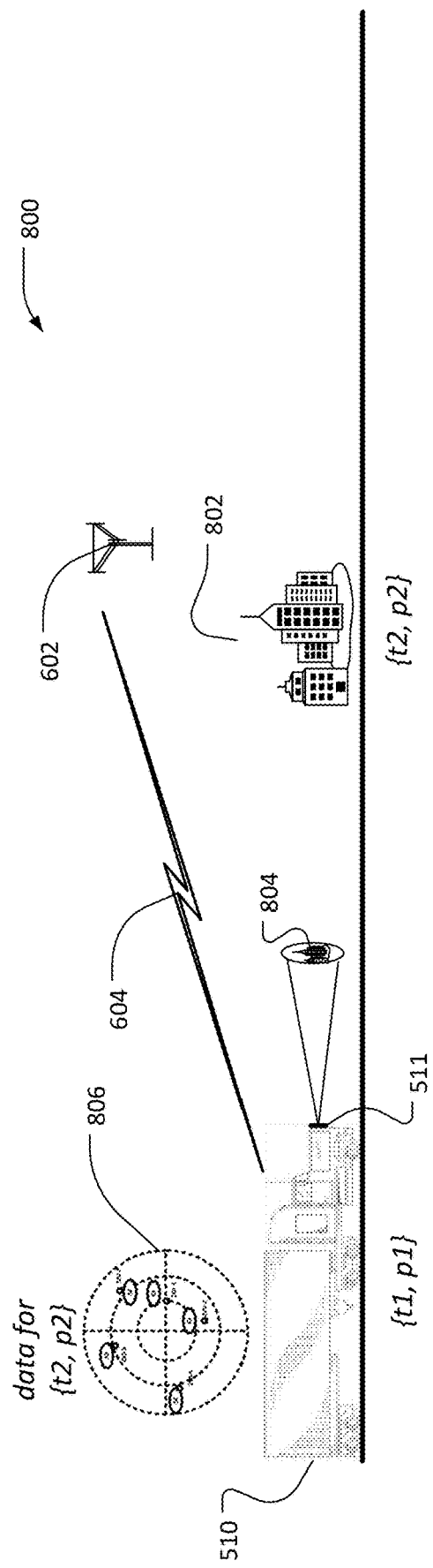
FIG. 8 is an example of an image-based satellite selection process.

In some embodiments, the UE 100 may comprise optical sensors such as CCD or CMOS sensors and/or camera(s) 180. In some embodiments, optical sensors may include or be coupled to a LIDAR unit/laser with associated instrumentation including scanners, photodetectors and receiver electronics. Optical sensors/camera(s) are hereinafter referred to "camera(s) 180". Camera(s) 180 may convert an optical image into an electronic or digital image and may send captured images to processor(s) 150. For example, as shown in FIG. 8, in some embodiments, camera(s) 180 (e.g., the camera 511) may be housed separately (e.g., on the front of a vehicle), and may be operationally coupled to display 190, processor(s) 150 and/or other functional units in UE 100.

In some embodiments, the UE 100 may also include Inertial Measurement Unit (IMU) 170. In some embodiments, the IMU 170, which may comprise 3-axis accelerometer(s), 3-axis gyroscope(s), and/or magnetometer(s), may provide velocity, orientation, and/or other position related information to processor(s) 150. In some embodiments, the IMU 170 may be configured to measure and output measured information synchronized to the capture of each image frame by camera(s) 180, and/or measurements taken by sensors 185 in the UE 100. In some embodiments, the output of the IMU 170 may be used, in part, by processor(s) 150 to determine a position and orientation of the UE 100.

Processor(s) 150 may be implemented using a combination of hardware, firmware, and software. In some embodiments, processor(s) 150 may include Computer Vision Processor (CVP) 155, which may implement a variety of image processing and Computer Vision (CV) functions. In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processor(s) 150. For example, the optical sensors/camera 180 may capture a series of 3-dimensional (3D) images from a Time-of-Flight camera, or associated pairs or multiple 2-dimensional (2D) frames captured by stereo, trifocal, or multifocal cameras. In some embodiments, camera(s) 180 may be a wearable camera, or an external camera, which may be operationally coupled to, but housed separately from, other functional units in the UE 100. In one embodiment, images captured by camera(s) 180 may be in a raw uncompressed format and may be compressed prior to being processed and/or stored in the memory 130. In some embodiments, image compression may be performed by the processor(s) 150 (e.g. by CVP 155) using lossless or lossy compression techniques.

In some embodiments, the optical sensors/camera 180 may be a depth sensing camera or may be coupled to depth sensors. The term "depth sensor" is used to refer to functional units that may be used to obtain depth information for an environment independently and/or in conjunction with camera(s) 180. In some embodiments, may comprise RGBD cameras, which may capture per-pixel depth (D) information when the depth sensor is enabled, in addition to color (RGB) images. As another example, in some embodiments, the camera(s) 180 may take the form of a 3D Time of Flight (3DTOF) camera. In embodiments with 3DTOF camera(s) 180, the depth sensor may take the form of a strobe light coupled to the 3DTOF camera(s) 180, which may illuminate objects in a scene and reflected light may be captured by a CCD/CMOS sensor in optical sensors/camera 180. Depth information may be obtained by measuring the time that the light pulses take to travel to the objects and back to the sensor. In some embodiments, the UE 100 may include or be coupled to LIDAR sensors, which may provide measurements to estimate relative displacement of the UE 100 between two locations.

The processor(s) 150 may also execute software to process image frames captured by camera(s) 180. For example, the processor(s) 150 and/or the CVP 155 may be capable of processing one or more image frames received from camera(s) 180 to determine the pose of camera(s) 180 and/or the UE 100, implementing various computer vision and image processing algorithms based on the images received from camera(s) 180. The pose of camera(s) 180 refers to the position and orientation of the camera(s) 180 relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

In some embodiments, the CVP 155 may implement various computer vision and/or image processing methods such as 3D reconstruction, image compression and filtering. The CVP 155 may also implement computer vision-based tracking, model-based tracking, Simultaneous Localization And Mapping (SLAM), etc. In some embodiments, the methods implemented by the CVP 155 may be based on color or grayscale image data captured by camera(s) 180, which may be used to generate estimates of 6-DOF pose measurements of the camera. SLAM refers to a class of techniques where a map of an environment, such as a map of an environment being modeled by UE 100, is created while simultaneously tracking the pose of UE 100 relative to that map. The environment model generated by the UE 100 may be used to predict clear and obstructed azimuths and elevations at a location. Further, in some embodiments, the processor(s) 150 may further comprise a Positioning Engine (PE) 156 (hereinafter PE 156), which may use information derived from images, sensor and wireless measurements by the UE 100 either independently, or in conjunction with received location assistance data to determine a position and/or a position uncertainty estimate for the UE 100. The PE 156 may be implemented using software, firmware, and/or dedicated circuitry, such as Application Specific Integrated Circuits (ASICs), Digital Signal Processors (DSPs), and/or dedicated processor (such as processor(s) 150).

In some embodiments, processor(s) 150 may comprise Location Assistance Data Processor (LADP) 158 (hereinafter LADP 158), which may process location assistance information comprising multipath and visibility map assistance information, updated GNSS satellite almanac and/or ephemeris information, which may then be used by the processor(s) 150 to select a signal acquisition/measurement strategy and/or determine a location. In some embodiments, the processor(s) 150/LADP 158 may also be capable of processing various other assistance information such as Long-Term Evolution (LTE) Positioning Protocol (LPP) or LPP extensions (LPPe) messages including assistance information either directly or in conjunction with one or more other functional blocks shown in FIG. 1. In some embodiments, PE 156 and/or LADP 158 may be used to obtain an initial absolute location of the UE 100.

In some embodiments, the UE 100 may include one or more UE antennas (not shown) which may be internal or external. The UE antennas may be used to transmit and/or receive signals processed by the transceiver 110 and/or the GNSS receiver 140. In some embodiments, the UE antennas may be coupled to the transceiver 110 and the GNSS receiver 140. In some embodiments, measurements of signals received (transmitted) by the UE 100 may be performed at the point of connection of the UE antennas and the transceiver 110. For example, the measurement point of reference for received (transmitted) RF signal measurements may be an input (output) terminal of the receiver 114 (transmitter 112) and an output (input) terminal of the UE antennas. In a UE 100 with multiple UE antennas or antenna arrays, the antenna connector may be viewed as a virtual point representing the aggregate output (input) of multiple UE antennas. In some embodiments, the UE 100 may measure received signals including signal strength and TOA measurements and the raw measurements may be processed by processor(s) 150. In some embodiments, transceiver 110 may include and/or be coupled to a RADAR unit, which may be used to obtain non-GNSS displacement measurements.

The methodologies described herein may be implemented by various means depending upon the application. For example, these methodologies may be implemented using modules in hardware, firmware, software, or any combination thereof. For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by the processor(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, the memory 130 may hold program code such as the applications 135 that facilitate GNSS based location determination, image processing, and other tasks performed by CVP 155, PE 156, and/or LADP 158, on the processor(s) 150. For example, the memory 130 may hold data, GNSS satellite measurements, captured still images, depth information, video frames, program results, as well as data provided by the IMU 170 and the sensors 185.

If implemented in firmware and/or software, the functions may be stored as one or more instructions or program code on a computer-readable medium, such as the medium 160 and/or the memory 130. Examples include computer-readable media encoded with computer programs and data associated with or used by the program. For example, the computer-readable medium including program code stored thereon may include program code to support GNSS based position determination.

Computer-readable medium 160 includes physical computer storage media. A storage medium may be any available medium that can be accessed by a computer. By way of example, and not limitation, such non-transitory processor-readable storage medium can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on the computer-readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement GNSS based position determination and/or other functions outlined herein. That is, the communication apparatus includes transmission media with signals indicative of information to perform disclosed functions.

The memory 130 may represent any data storage mechanism. The memory 130 may include, for example, a primary memory and/or a secondary memory. Primary memory may include, for example, a random-access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions stored thereon, which if executed by at least one processor(s) 150 may be operatively enabled to perform all or portions of the example operations as described herein. Computer-readable medium 160 may be a part of memory 130.

The UE 100 may include a screen or display 190 capable of rendering color images, including 3D images. In some embodiments, the display 190 may be used to display live images captured by camera(s) 180, Graphical User Interfaces (GUIs), program output, etc. In some embodiments, the display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, the display 190 may be implemented using a Liquid Crystal Display (LCD) display or a Light Emitting Diode (LED) display, such as an Organic LED (OLED) display.

In some embodiments, the processor(s) 150 may also receive input from one or more sensors in sensors 185, which may include, for example, a magnetometer, altimeter and/or barometer. The magnetometer may be capable of measuring the intensity and/or the direction of the Earth's magnetic field and may serve as a compass and/or provide an indication of a direction of travel of the UE 100. The altimeter may be used to provide an indication of altitude above a calibrated level, while the barometer may provide an indication of atmospheric pressure, which may also be used to obtain a determination of altitude.

In some embodiments, the sensors 185 may include one or more of an ambient light sensors, acoustic transducers such as microphones/speakers, ultrasonic transducers, and/or depth sensors, which may be used to acquire depth information and/or determine distance to a target. In general, the list of sensors above in not exhaustive and sensors 185 may include various other types of sensors and transducers which are increasingly being incorporated into user devices such as vehicle mounted devices, smartphones, and other mobile devices. In some embodiments, the UE 100 may not include one or more sensors in sensors 185. For example, one or more of an altimeter, barometer, and/or magnetometer may be omitted.

Figure 2:
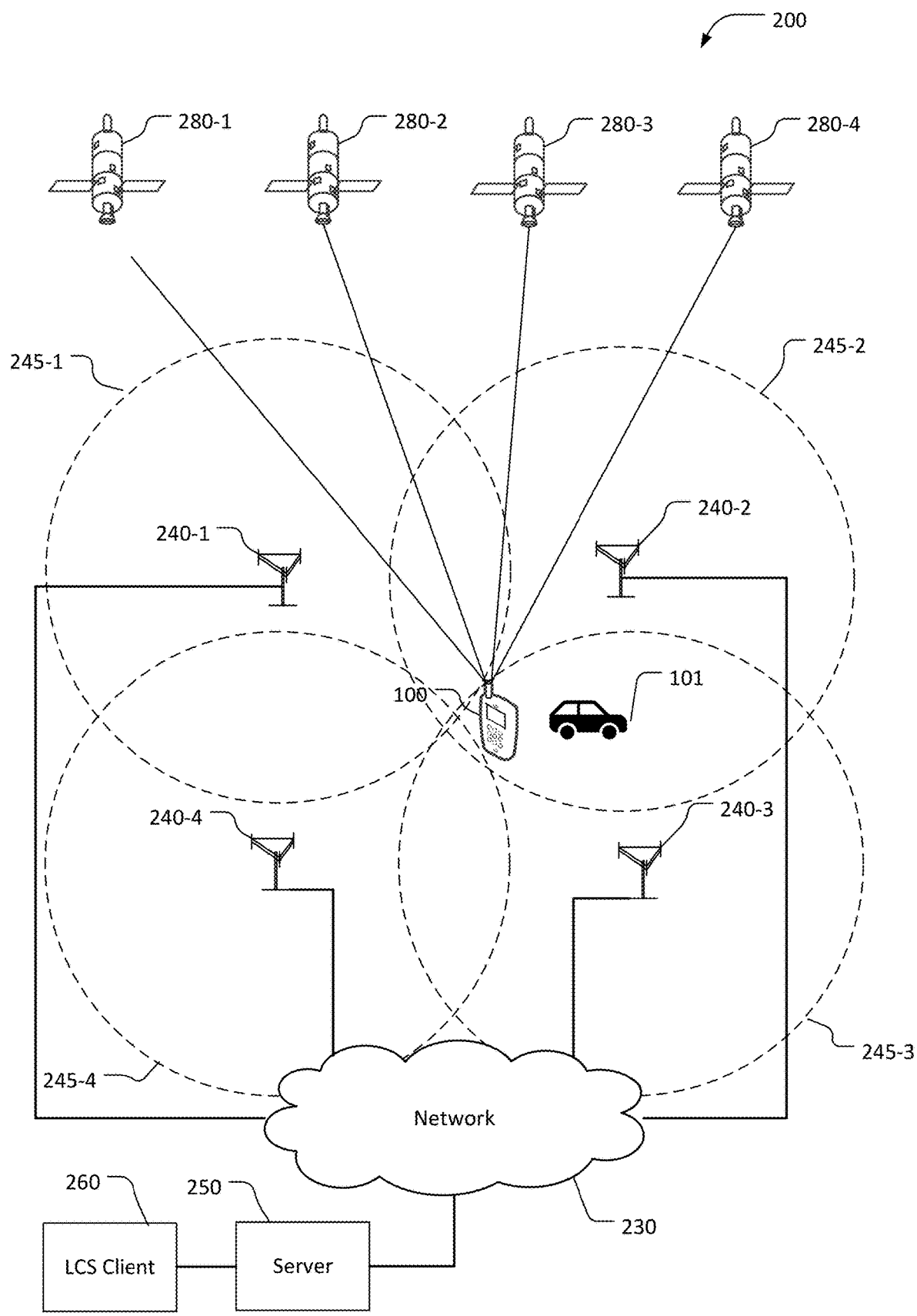
FIG. 2 is an example of a system capable of providing Location, and/or Navigation services to UEs including the transfer of location assistance data or location information.

Referring to FIG. 2, an example an architecture of a system 200 capable of providing Location, and/or Navigation services to the UE 100 and/or a vehicle 101 including the transfer of location assistance data or location information is shown. As used herein, the UE 100 and vehicle 101 may be used interchangeably. In some embodiments, the system 200 may be used to transfer location assistance data such as updated almanac or ephemeris data for one or more GNSS satellites to the UEs 100. In some instances, the system 200 may be used for mapping or location services, such as for use with map aided GNSS satellite selection in a manner consistent with embodiments disclosed herein.

As illustrated in FIG. 2, the UE 100 may communicate with a server 250 through a network 230 and base station antennas 240-1-240-4, which may be associated with the network 230. The server 250 may, in some instances, provide the functionality of one or more of a location server, location assistance server, position determination entity (PDE), or another network entity. The transfer of the location and other information may occur at a rate appropriate to both UE 100 and server 250.

In some embodiments, the system 200 may use messages such as LPP or LPPe messages between the UE 100 and the server 250. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, the UE 100 may receive location assistance information such as almanac/ephemeris data for one or more SVs (e.g. GNSS satellites) 280-1, 280-2, 280-3, 280-4 from base station antennas 240-1-240-4, which may be used for position determination. Antennas 240-1-240-4 may form part of a wireless communication network, which may be a wireless wide area network (WWAN), wireless local area network (WLAN), etc. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network. The techniques may also be implemented in conjunction with any combination of WWAN, WLAN, etc. For example, antennas 240-1-240-4 and network 230 may form part of, e.g., an evolved UMTS Terrestrial Radio Access Network (E-U IRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

The UE 100 is configured to receive signals from one or more Earth orbiting Space Vehicles (SVs) 280 such as SVs 280-1-280-4, which may be part of a GNSS. SVs 280-1-280-4, for example, may be in a GNSS constellation such as the US Global Positioning System (GPS), the European Galileo system, the Russian Glonass system, or the Chinese Compass system. In accordance with certain aspects, the techniques presented herein are not restricted to global satellite systems. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS/GNSS may include any combination of one or more global and/or regional navigation satellite systems and/or augmentation systems, and SPS/GNSS signals may include SPS, SPS-like, and/or other signals associated with such one or more SPS/GNSS. The SPS/GNSS may also include other non-navigation dedicated satellite systems such as Iridium or OneWeb. In some embodiments, the GNSS receiver 140 may be configured to receive signals from one or more of the above SPS/GNSS/satellite systems.

For simplicity, one UE 100, vehicle 101, and server 250 are shown in FIG. 2. In general, system 200 may comprise multiple cells indicated by 245-$k$ ($0 \le k \le N_{cells}$, where $N_{cells}$ is the number of cells) with additional networks 230, LCS clients 260, UEs 100, vehicles 101, servers 250, (base stations) antennas 240-1-240-4, and Space Vehicles (SVs) 280-1-280-4. System 200 may further comprise a mix of cells including microcells and femtocells in a manner consistent with embodiments disclosed herein. In an example, the LCS client 260 may be included in individual devices such as the UE 100 and/or the vehicle 101 and configured to provide location services to the respective users and/or applications executing on the devices.

The UE 100 may be capable of wirelessly communicating with the server 250 through one or more networks 230 that support positioning and location services to obtain an initial coarse location, which may be used in conjunction with almanac/ephemeris information to determine a more precise location using GNSS based position determination. For example, the UE 100 may use a GNSS based position determination and compute its position based on measurements from one or more of: the IMU 170, and/or captured images and/or, GNSS carrier phase observables (e.g. based on measurements of signals received from SVs 280).

Figure 3:
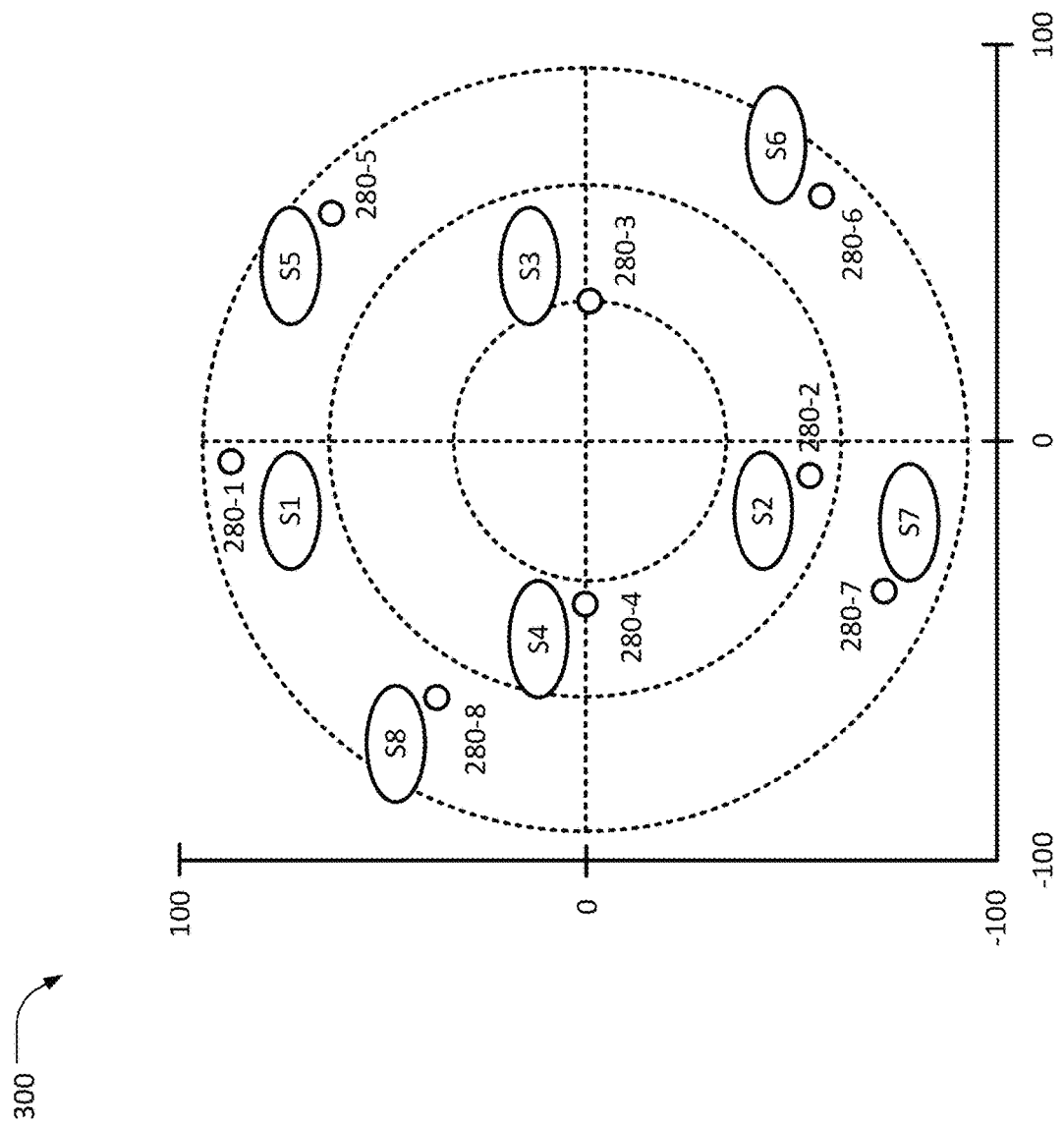
FIG. 3 is an example skyplot of eight GNSS Space Vehicles (SVs) at a point in time.
Figure 4:
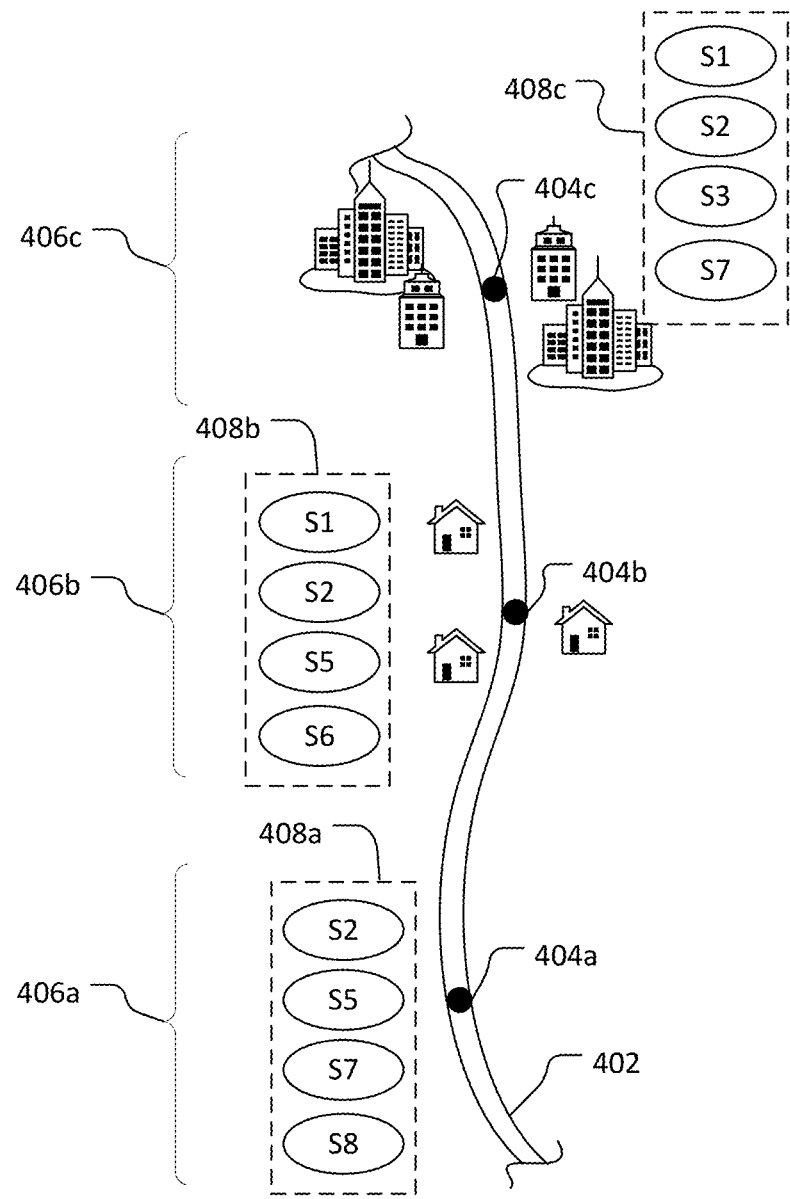
FIG. 4 is an example map-aided satellite selection process.

Referring to FIG. 3, an example skyplot 300 of eight GNSS SVs 280-1 through 280-8 at a point in time are shown. The skyplot 300 provides an indication of the elevation and azimuth of the SVs 280 relative to a user's current position at the current time. Referring to FIG. 4, an example of a map-aided satellite selection process is shown. FIG. 4 includes a road 402 with three example locations including a first location 404a, a second location 404b and a third location 404c. For the purposes of explaining map-aided satellite selection, the skyplot 300 of FIG. 3 is assumed to represent the set of SVs that are visible to a UE 100 at each of the locations 404a-c in FIG. 4. In operation, the locations of the SVs in the skyplot 300 will change over time at each of the locations because the SVs are continuously moving in their respective orbits. The first location 404a is on the road 402 in an open area 406a. The open area 406a may be a relatively flat geography such as fields with minimal vertical obstructions between the SVs and the first location 404a. The second location 404b is on the road 402 in a moderately obstructed area 406b. Examples of a moderately obstructed area 406b include suburban neighborhoods, rolling hills, wooded areas, or other areas which may include some obstructions between the SVs and the second location 404b. The third location 404c is located on the road 402 in a heavily obstructed area 406c. Examples of a heavily obstructed area 406c include dense urban areas and other natural barriers (i.e., canyons, mountains, etc.) which may create significant obstructions between the SVs and the third location 404c. A vehicle traveling along the road 402 from the first location 404a to the third location 404c will utilize different SVs to generate locations (i.e., fixes) because one or more of the SVs may be obstructed as the vehicle traverses the different areas 406a-c. In this example, the SVs 280-1-280-8 are assumed to be in fixed positions as indicated on the skyplot 300 to facilitate the explanation. In operation, the SVs 280-1-280-8 are in motion and the associated ephemeris data may be used to predict an updated sky view for a given time and location. At the first location 404a, the UE 100 has a relatively unobstructed view of the sky and hence the SVs at lower elevation angles may be used in determining a fix. For example, a first subset of SVs 408a may be used to generate a fix at the first location 404a. The first subset of SVs 408a includes S2, S5, S7 and S8. As the vehicle proceeds to the second location 404b, the moderately obstructed area 406b may include features such as buildings or other natural obstructions which may interfere with signals sent from SVs at lower angles for some azimuths. For example, a second subset of SVs 408b may include S1, S2, S5 and S6 because S7 and S8 which were previously used at the first location 404a are now obstructed. For conventional GNSS location determination schemes using carrier phase observables, a constant lock with more than one SV is needed to calculate a UE position. Cycle slips, such as may occur when the vehicle enters more obstructed areas 406b-c, may prevent the use of traditional carrier phase based accurate GNSS position locations. Thus, the position accuracy of the fixes generated by the UE 100 is reduced when the track on an SV is lost and a signal from a new SV must be acquired.

When the vehicle reaches the third location 404c in the heavily obstructed area 406c, a third subset of SVs 408c may be used to generate a fix. The third subset of SVs 408c includes S1, S2, S3 and S7 because the current azimuths and elevations of many of the SVs may be obstructed by buildings or other natural barriers. Azimuth angles aligned with the road 402 may be open and thus low elevation SVs S1 and S7 may still be used. S7 may be reacquired (e.g., it was used for determining a fix at the first location 404a), but the integer ambiguity value (e.g., cycle slip) may limit the accuracy of the positional data. SV S2 is present in each of the SV subsets 408a-c and thus may provide accurate positioning data via the uninterrupted carrier wave signals received by the UE 100 as the vehicle traverses the road 402. Map-aided satellite selection utilizes environment model information, such as 3-D map information, to predict visible SVs along a trajectory and configure the tracking filters based on the predicted SVs. In the example presented in FIG. 4, a vehicle at the first location 404a would utilize the 3-D map information associated with the second location 404b and the third location 404c to determine the first, second and third SV subsets 408a-c to load into the tracking filters. Priority is given to the SVs that may be visible along the entire trajectory (e.g., S2) and may provide constant carrier wave information. The map-aided satellite selection process reduces computational load on the UE 100 because the number of SVs in the tracking filters may be reduced.

Figure 5:
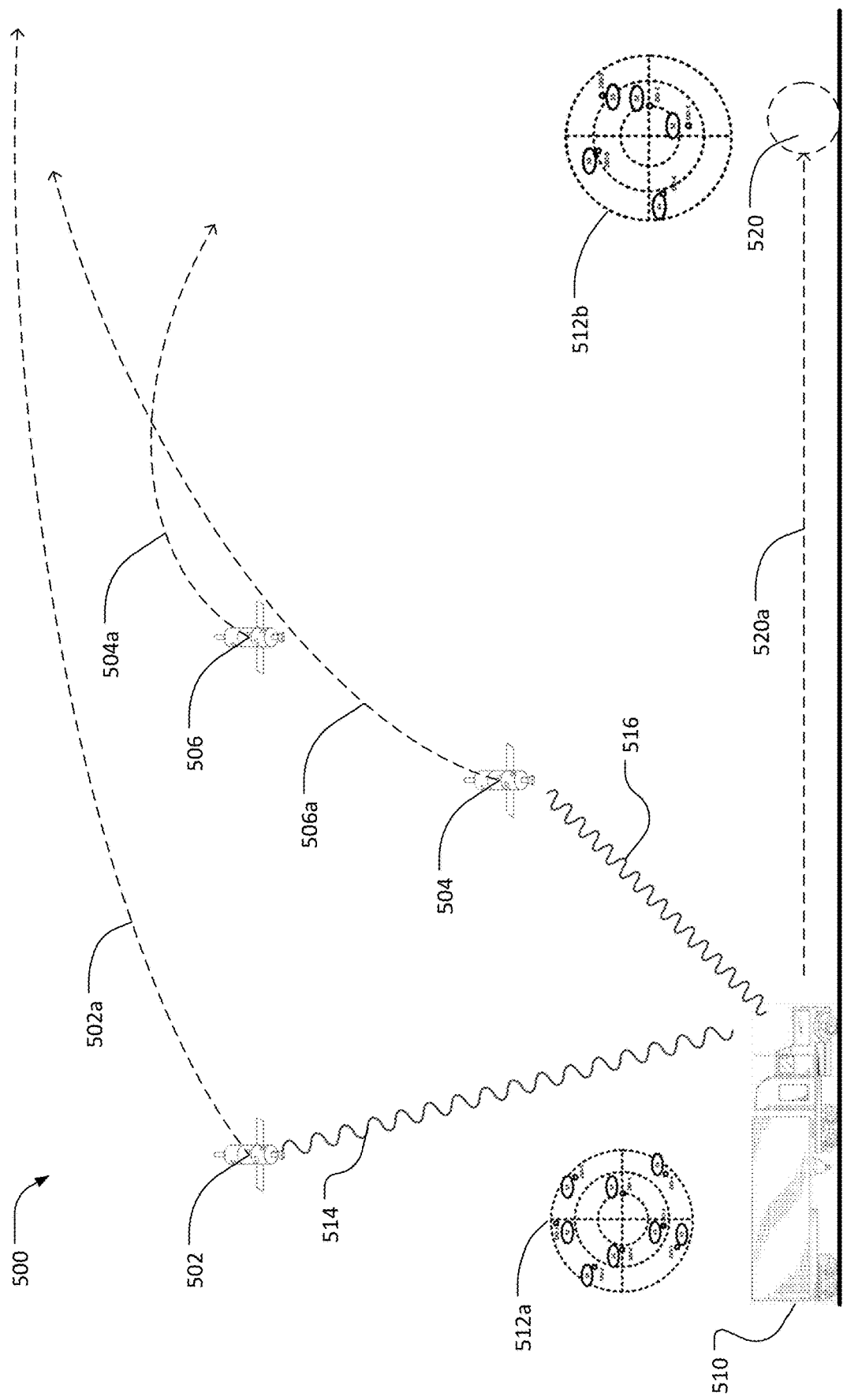
FIG. 5 is an example of a map-aided satellite selection process based on a vehicle trajectory.

Referring to FIG. 5, an example of a map-aided satellite selection process 500 based on a vehicle trajectory is shown. The process 500 includes a first SV 502, on a first trajectory 502a, a second SV 504, on a second trajectory 504a, a third SV 506, and a third trajectory 506a. The number and location of the SVs are examples and not a limitation as many more SVs (e.g., 10-40) may be visible for a given terrestrial location. A vehicle 510, such as a tractor-trailer, autonomous vehicle, automobile, etc., equipped with a UE 100 or other navigation device, is moving along a trajectory 520a towards a future location 520. The vehicle 510 is an example of a mobile device. For example, in an embodiment, the vehicle 510 may include a vehicle navigation system. The vehicle 510 is located at a first position {p1} at a first time {t1}, and is detecting at least a first signal 514 from the first SV 502 and a second signal 516 from the second SV 504. In an example, the UE 100 may include carrier wave observations of the first and second signals 514, 516 in calculations to determine a current location of the vehicle 510. The trajectory 520a will bring the vehicle 510 (and the UE 100) to the future location 520 at a future time. The future location is a second position {p2} and the future time is a second time {t2}.

A first subset of SVs 512a may be visible to the UE 100 at the first time and position {t1, p1} and a second subset of SVs 512b may be visible to the UE 100 at the second time and position {t2, p2}. The PE 156 may utilize sensor information (e.g., accelerometers, compass headings) and map information (e.g., stored in memory 130) to determine an estimated latitude, longitude, and altitude for second location {p2}, as well as the estimated time of arrival (TOA) to determine the second time {t2}. In an example, the distance between the first position {p1} and the second position {p2} may be 300, 500, 1000, 2000 yards. The process 500 may also be used over longer distances. The LADP 158 and the medium 160 may be configured to store ephemeris data associated with many SVs. The processors may be configured to determine the azimuth and elevation angles for the second subset of SVs 512b, which are visible at the second time and position {t2, p2}. The processors 150 may be configured to utilize the second subset of SVs 512b to track SVs at the first time and position {t1, p1}. That is, the navigation filters within the UE 100 may be configured to include SVs in the second subset of SVs 512b, and to give priority to SVs that the UE 100 is currently using for position calculations. Selecting the carrier waves from SVs which the UE 100 may observe along the trajectory 520a may improve positioning accuracy of the UE 100 and avoid the position uncertainty caused by integer ambiguity associated with losing/regaining SV carrier wave signals. The process 500 may iterate along the trajectory 520a such that new future locations at new future times may be continually evaluated and the navigation filters may be updated with the variables associated with new future SVs.

Figure 6:
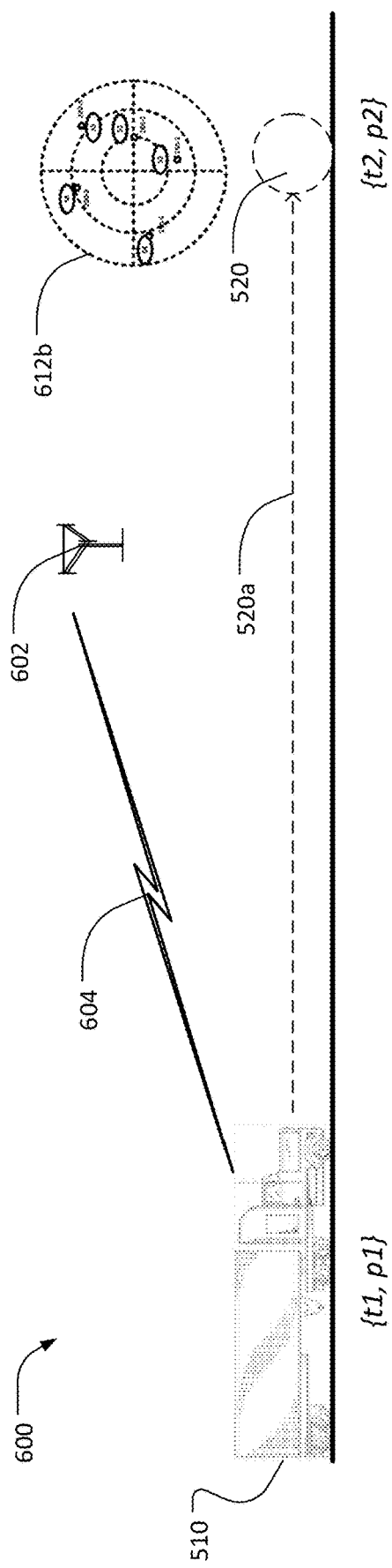
FIG. 6 is an example of a network assisted map-aided satellite selection process based on a vehicle trajectory.

Referring to FIG. 6, with further references to FIGS. 2 and 5, an example of a network satellite selection process 600 based on a vehicle trajectory is shown. The process 600 is similar to the process 500 in FIG. 5 in that the vehicle 510 (including the UE 100 or similar navigation device) is at the first location {p1} at the first time {t1} and is proceeding along the trajectory 520a to the second location {p2} and the second time {t2}. The vehicle 510 may establish a wireless communication link 604 with a base station 602. The base station 602 may include a base station antenna 240-1-240-4 and may be associated with a network 230 as described in FIG. 2. In an example, the vehicle 510 may provide current location and vehicle state information to the base station 602 via the wireless communication link 604. The vehicle state information may include information from the sensors 185 (e.g., speed, direction, altitude), as well as information from the GNSS receiver 140 (e.g., tracked SVs). The base station 602 may communicate with a server 250 to determine the second time and location {t2, p2} and a corresponding set of observable SVs 612b. The second time and location {t2, p2} may be based on a standard time or distance along the trajectory 520a (e.g., 200, 500, 1000 yards), or on prior knowledge of potential obstructions. For example, the second time and location {t2, p2} may represent a canyon with known obstructions for certain elevations and azimuths. The server 250 may be configured to select a set of SVs that will be visible (i.e., not obstructed) at the second time and location {t2, p2} and provide the SV information to the vehicle 510 via the base station 602. The vehicle 510 may then track SVs based on the received SV information. The vehicle 510 may provide updated location and vehicle state information to the base station 602 (or other base stations connected the network 230) on a periodic basis (e.g., 10 sec, 20 sec, 1 min, 5 min, etc.), or based on established geofences.

Figure 7:
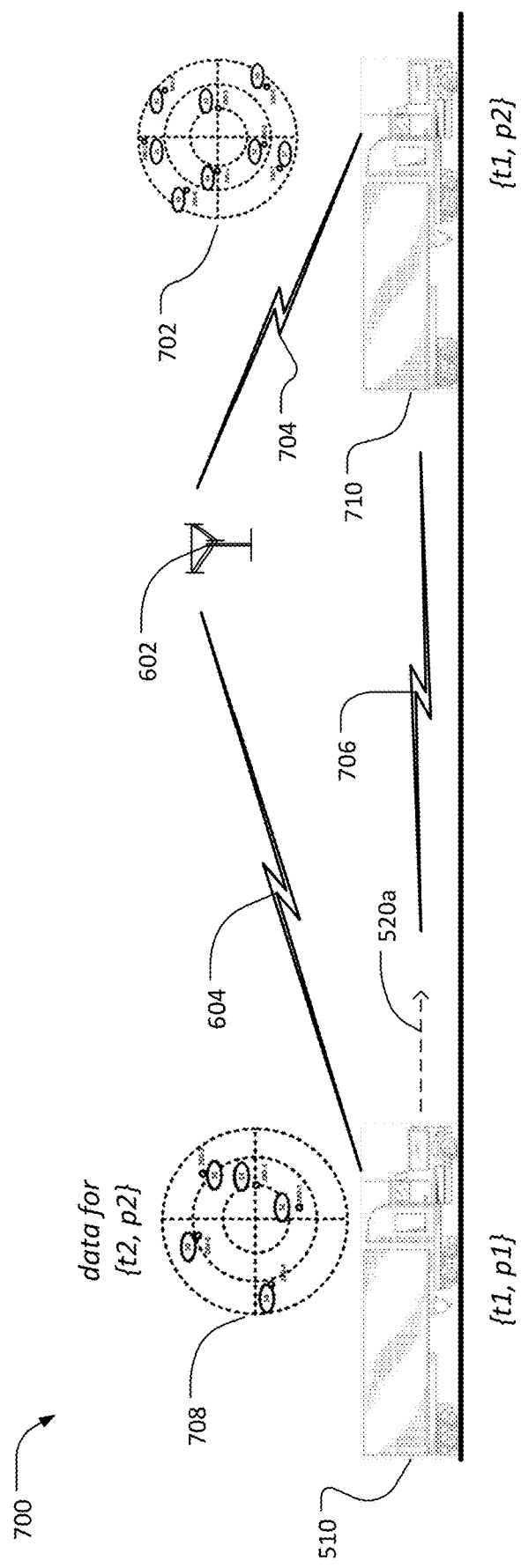
FIG. 7 is an example of a vehicle-to-vehicle satellite selection process.

Referring to FIG. 7, with further reference to FIGS. 2, 5, and 6, an example of a vehicle-to-vehicle satellite selection process 700 is shown. A first vehicle 510 is proceeding along a trajectory 520a from a first position {p1} to arrive at a second position {p2} at a second time {t2}. At a first time {t1} the first vehicle 510 is located at the first position {p1} and a second vehicle 710 is located at the second position {p2}. The second vehicle 710 includes a UE 100 or similar navigation device and is configured to receive SV signals. The second vehicle 710 may identify a current set of SVs 702 that are visible (i.e., not obstructed) from the second position {p2} at the first time {t1}. The second vehicle 710 may establish a communication link 706 with the base station 602 to provide information associated with the current set of SVs 702 (e.g., SVid, SNR) as well as vehicle state information (e.g., location, speed, etc.) to the server 250. The first vehicle 510 may also provide SV and vehicle state information to the server via the communication link 604. The server 250 is configured to utilize ephemeris data associated with the current set of SVs 702 to determine a second set of SVs 708 which will be visible at the second position {p2} at the second time {t2}. The first vehicle 510 is configured to set its navigation filters based on the second set of SVs 708. In an example, the second vehicle 710 may be configured to provide vehicle state information and/or the current set of SVs 702 to the first vehicle 510 via a dedicated short-range communications (DSRC) link 706. The first vehicle 510 may be configured to compute the second set of SVs 708 for {t2, p2} based on ephemeris data stored in the memory 130. While the above example provides for different steps by the leading vehicle (i.e., the second vehicle 710) and the lagging vehicle (i.e., first vehicle 510), in operation, each of the vehicles may be configured to perform the functions of the leading and lagging vehicles and more than two vehicles may be involved in the process 700. A continuous succession of lagging vehicles may become leading vehicles to other vehicles behind them on the trajectory 520*a*, such that the lagging vehicles receive future SV information and may update their navigation filters accordingly.

Referring to FIG. 8, with further reference to FIG. 6, an example of an image-based satellite selection process 800 is shown. A vehicle 510 includes a UE 100, or similar navigation device, including a camera 511. The camera 511 may be an optical sensors/camera 180 configured to capture a series of images 804 of a future location 802 along a trajectory of the vehicle 510. The future location 802 may include buildings or natural structures and the CVP 155 may be configured to solve a structure-from-motion problem to reconstruct the 3-D environment. The computed 3-D environment may be used in conjunction with SV ephemeris data to determine unobstructed SVs (i.e., clear view) at the future location. For example, the vehicle 510 may be on a trajectory to arrive at the future location 802 (i.e., a second position {p2}) at a future time (i.e., a second time {t2}). The unobstructed SVs may be a set of SVs 806 based on elevation and azimuth angles of SVs as compared to the visible obstructions at the second location {p2}. In an example, the vehicle 510 (UE 100 and camera 511) may be configured to provide a plurality of images and vehicle state information (i.e., position, velocity measurement, heading measurement) to a base station 602 via a wireless communication link 604. The base station 602 may be part of the network 230 including a server 250. The server 250 may be configured to solve a structure-from-motion problem using the images and vehicle state information to construct a 3-D model for the second position {p2}. The server 250 may utilize the 3-D model in combination with SV ephemeris data to determine obstructed and unobstructed views based on elevation and azimuth angles from points traversing into, through, and exiting the second location {p2}. The base station 602, or other network resource, may be configured to send the set of SVs 806 computed by the server 250 to the vehicle 510 via the wireless communication link 604. The vehicle 510 may utilize the set of SVs 806 to track SVs from its current location (i.e., a first location {p 1} at a first time {t1}). Preference for the SVs to track may be based on the SVs that are currently visible to the vehicle 510 (i.e., at the first time and first position {t1, p1}) and will be visible at the second location at the second time {t2, p2}. While one camera 511 is shown in FIG. 8, multiple cameras and other sensors (e.g., LIDAR) may be used to obtain environment data to construct a 3-D model.

Figure 9:
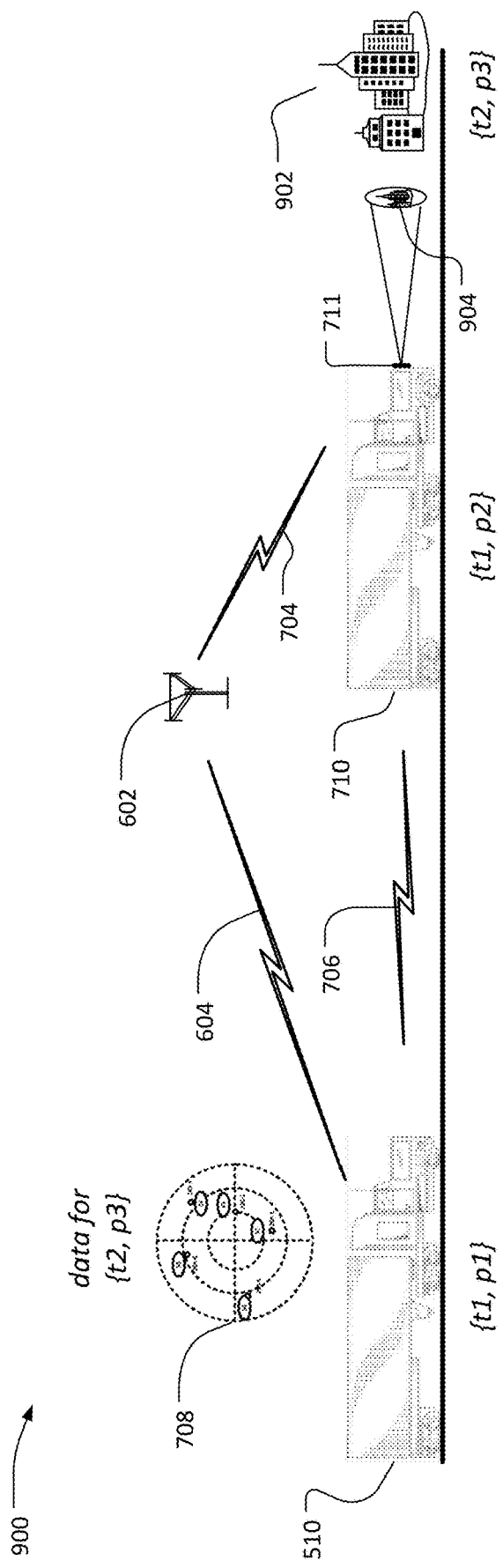
FIG. 9 is an example of a vehicle-to-vehicle image-based satellite selection process.

Referring to FIG. 9, with further reference to FIG. 7, an example of a vehicle-to-vehicle image-based satellite selection process 900 is shown. The process 900 includes a first vehicle 510 which is lagging behind a second vehicle 710 along a trajectory towards a future location 902. The second vehicle 710, includes a UE 100 or other navigation device with a camera 711. The camera 711 may be an optical sensors/camera 180 configured to capture a series of images 904 of the future location 902 along the trajectory. Other mapping and image capture technologies may also be used. The image processing capabilities of the second vehicle 710 are similar to the process 800 described in FIG. 8. In an example, the second vehicle 710 may send environment model information about the future location 902 from a second location {p2} at a first time {t1} via a wireless communication link 704. In an example, the second vehicle 710 may be at the future location 902 (e.g., in an urban canyon) and may provide 3-D model information based on images obtained from the camera 711. The base station 602 may receive the 3-D model information and the server 250 may be configured to determine a set of SVs 708 for the first vehicle 510 based on the estimated time the first vehicle 510 will arrive at the future location 902 (i.e., {t2, p3}). In an example, the first vehicle 510 may be configured to receive 3-D model data and vehicle state information from the second vehicle 710 via a DSRC link 706. In an example, the second vehicle 710 may also send current SV information and the first vehicle 510 may determine which SVs to track based on the current SV information for the second vehicle 710 and the projected SV data based on the 3-D model of the future location. Priority may be assigned to the SVs which will be visible along the trajectory at {p1}, {p2} and {p3}.

Figure 10:
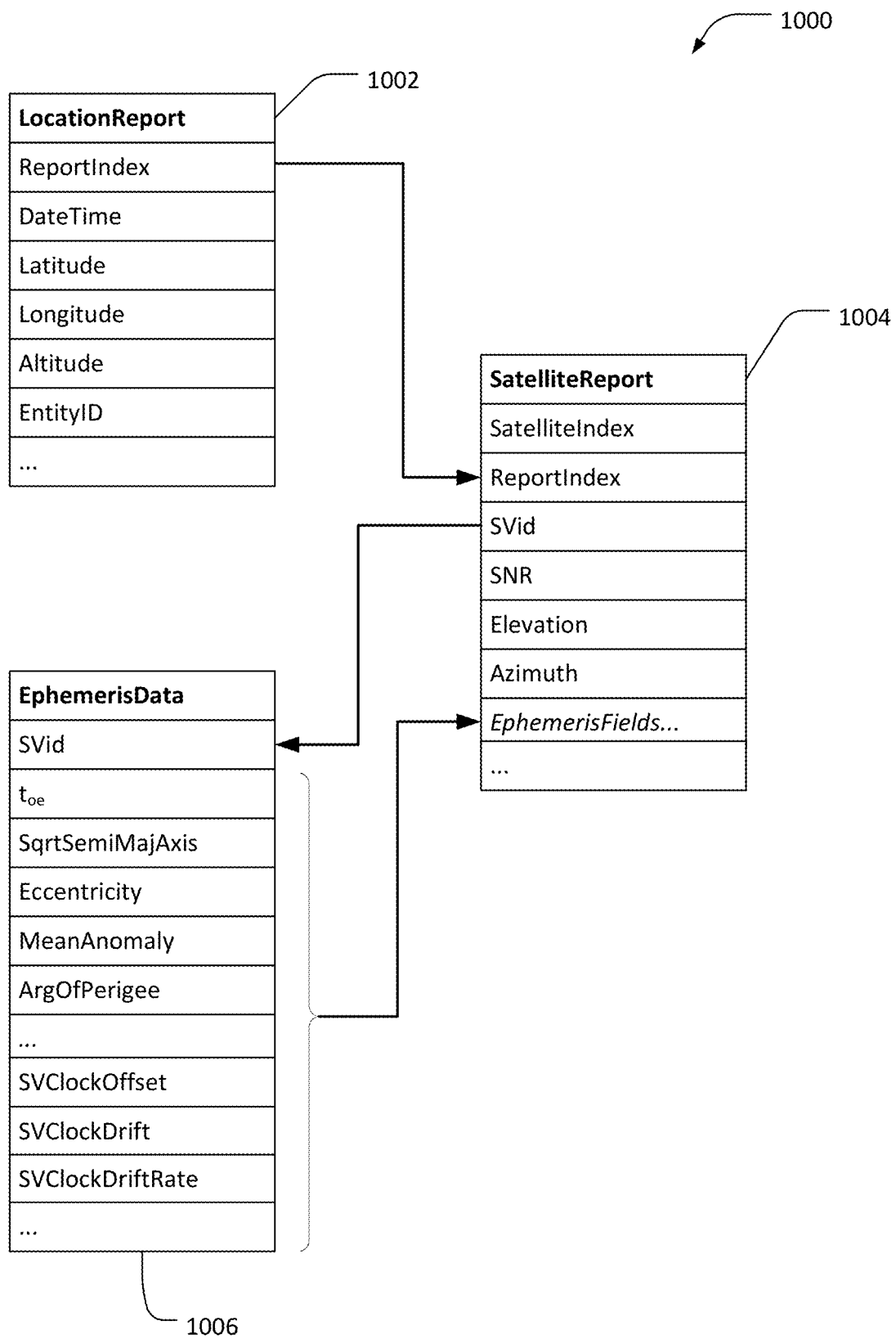
FIG. 10 is an example data structure used in a map-aided satellite selection system.

Referring to FIG. 10, an example data structure 1000 for use in a map-aided satellite selection process is shown. The data structure 1000 may persist as one or more flat files (e.g., JSON, XML, CVS, etc.), or within a relational database (e.g., SQL, Oracle, dBase, etc.). The tables and fields in the data structure 1000 are examples, and not limitations, as other tables, fields, indexes and relationships may be used. In an example, the data structure may include a LocationReport table 1002, a SatelliteReport table and a link to an EphemerisData table 1006. The LocationReport table 1002 may include fields associated with the time and location of a UE 100 (and/or vehicle 510) when providing SV information. The LocationReport table 1002 may include an index value, DateTime information, location information including latitude, longitude, and altitude. An EntityID value may be used to track the device providing the SV information. The SatelliteReport table 1004 may be linked to the LocationReport table 1002 and may include fields associated with SV measurement information. For example, a SVid field may be used to identify an SV. The signal-to-noise (SNR) field may be used to record the strength of a signal received from the SV at the DateTime. A low signal strength may be considered as an obstructed view of the SV. The elevation and azimuth fields may be used to define the location of SV relative to the location information on the LocationReport 1002. In an example, one or more Ephemeris fields may be added to the SatelliteReport 1004. The Ephemeris fields may be obtained from the EphemerisData table 1006. In an example, the EphemerisData table 1006 may persist on a remote server and may be accessed via a query based on the SV id, location or date and time information. The EphemerisData table 1006 may include ephemeris data used on pseudo-range navigation calculations as known in the art. For example, the EphemerisData table 1006 may contain one or more parameters associated with the Galileo system such as an ephemerides reference epoch in seconds within the week, the square root of semi-major axis, eccentricity, mean anomaly at reference epoch, argument of perigee (i.e., the angle measured from the ascending node to the perigee point), inclination at reference epoch, longitude of ascending node at the beginning of the week, mean motion difference, rate of inclination angle, rate of node's right ascension, latitude argument correction, orbital radius correction, inclination correction, SV clock offset, SV clock drift and SV clock drift rate. Other parameters associated with other navigation systems may also persist in the EphemerisData table 1006. The data structure 1000 may be used to crowdsource satellite reports to construct environment models for locations. In an example, the SNR values for various SVs and the corresponding elevation and azimuth values may be aggregated to generate obstruction models. The elevation and azimuth angles with relatively low SNR values may be considered as obstructed. This data may be used with map-aided satellite selection for subsequent trajectories through the location.

Figure 11A:
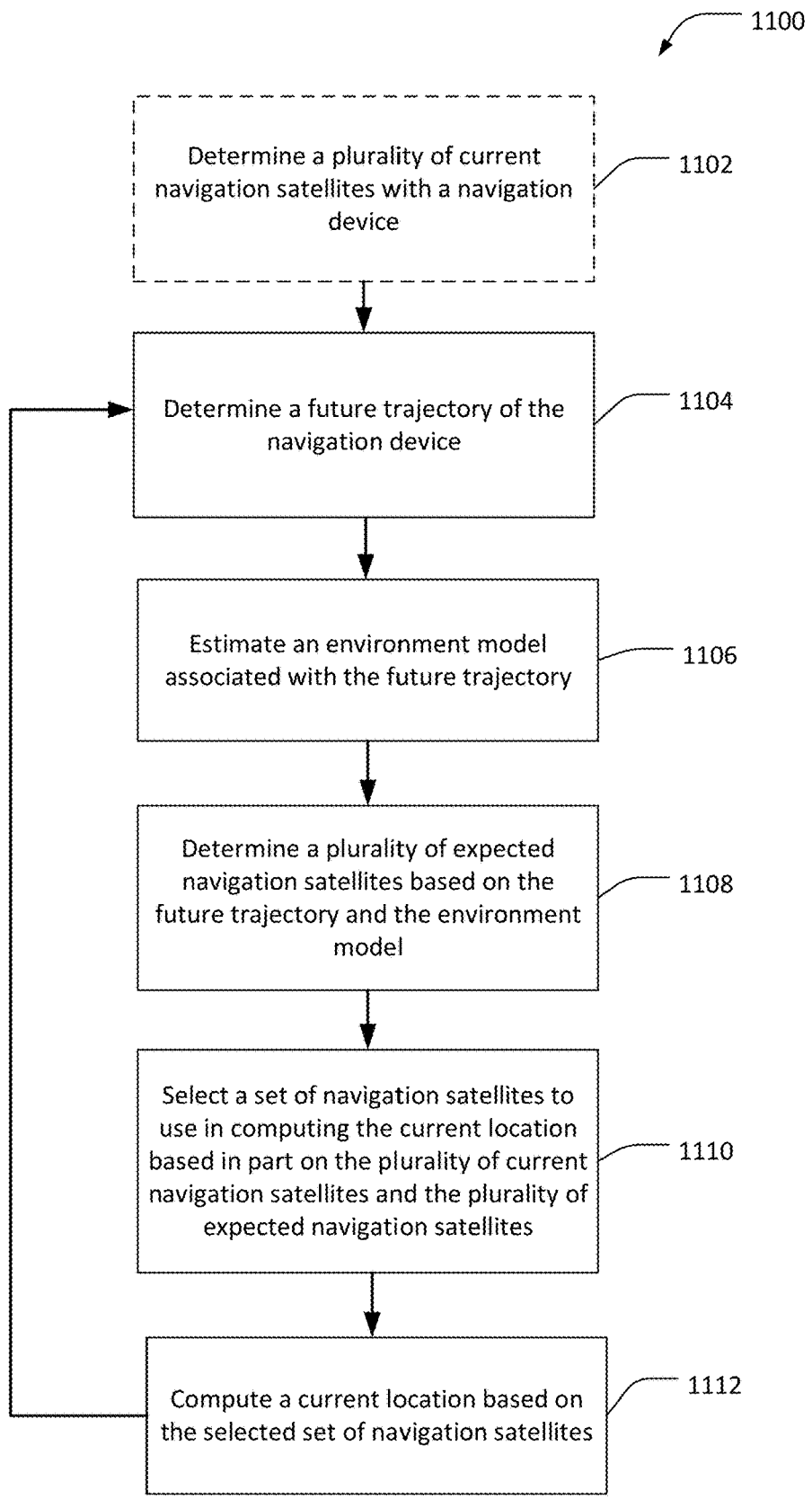
FIG. 11A is an example process flow for determining a current location based on map-aided satellite selection.

Referring to FIG. 11A, with further reference to FIG. 5, a method 1100 for determining a current location based on map-aided satellite selection is shown. The method 1100 is, however, an example and not limiting. The method 1100 may be altered, e.g., by having stages added, removed, rearranged, combined, performed concurrently, and/or having single stages split into multiple stages.

At stage 1102, the method optionally includes determining a plurality of current navigation satellites (e.g., space vehicles (SVs)) with a navigation device. In an example, the processor 150 and the GNSS receiver 140 may be a means for determining a plurality of current navigation satellites. A vehicle 510 may be located at a first position {p1} at a first time {t1} and may detect the SVs 502, 504, 506 with a UE 100 or other navigation device that is associated with the vehicle 510. In an example, the UE 100 may utilize carrier wave phase information received from one or more of the SVs to determine a location.

At stage 1104, the method includes determining a future trajectory of the navigation device. In an example, the PE 156 in the UE 100 may be a means for determining a future trajectory. In an autonomously driving vehicle, a path planning module may be used to determine the future trajectory. In an example, input from the sensors 185 may provide vehicle state information such as speed and direction and the memory 130 may include mapping information. The combination of vehicle state information and map data may be used to determine the trajectory. The future trajectory includes both location and time to enable a correlation with the future locations of satellites, which are also moving in their respective orbits. As an example, the trajectory 520a leads to the future location 520 (i.e., the second location at a second time {t2, p2}).

At stage 1106, the method includes estimating an environment model associated with the future trajectory. In an example, the memory 130 and or optical sensors/camera(s) 180 may be means for estimating an environment model. The environment models may represent a 3-D environment of a location based on previously determined 3-D map data stored in the memory 130 or received via the LADP 158 data link layer. The 3-D map data may include information indicating the obstructed elevation and azimuth angles along the trajectory 520a including the approach, transiting, and exiting the future location 520. In an example, an optical sensors/camera(s) 180 may include a forward-facing camera on the vehicle 510 such as the camera 511. The CVP 155 may be configured to obtain images from the camera 511 and input from the sensors 185 to solve structure-from-motion problems to estimate the 3-D environment. In an example, combinations of 3-D map data and images obtained from the camera 511 may be used to estimate the 3-D environment.

At stage 1108, the method includes determining a plurality of expected navigation satellites (e.g., space vehicles (SVs)) based on the future trajectory and the environment model. In an example, the processor(s) 150 may be a means for determining the plurality of expected navigation satellites. The LADP 158 may be configured to process location assistance information including visibility map assistance information, updated GNSS satellite almanac and/or ephemeris information, which may then be used by the processor(s) 150 with the environment model information to select a signal acquisition/measurement strategy and/or determine a location. The visibility map may be filtered based on the unobstructed elevation and azimuth angles associated with the environment model. The available set of SVs based on the ephemeris data may be limited to SVs that will remain visible (i.e., not obstructed) by the environment at the time the vehicle will be proximate to the environment.

At stage 1110, the method includes selecting a set of navigation satellites to use in computing the current location based in part on the plurality of current navigation satellites and the plurality of expected navigation satellites. In an example, the processor(s) 150 may be a means for selecting a set of navigation satellites. The current navigation satellites detected at optional stage 1102 may be a starting set for determining the set of navigation satellites. For example, preference may be given to the navigation satellites which will be visible in the 3-D environment during the predicted future trajectory determined at stage 1104. Other known navigation selection criteria, such as ionospheric estimates or other methods to reduce the dilution of precision, may also be used to determine the set of navigation satellites.

At stage 1112, the method includes computing a current location based on the selected set of navigation satellites. In an example, the processor(s) 150 and the GNSS receiver 140 may be a means for computing a current location. The navigation filters in the GNSS receiver 140 may be configured based on the variables associated with the set of navigation satellites determined at stage 1110. The LADP 158 may be configured to process location assistance information comprising updated GNSS satellite almanac and/or ephemeris information, which may then be used by the processor(s) 150 with the signals received by the GNSS receiver 140 to determine a current location. The method 1100 can iterate back to stage 1104 such that the environment model and the corresponding navigation satellite selection may be updated on a periodic or on a near continual basis.

Figure 11B:
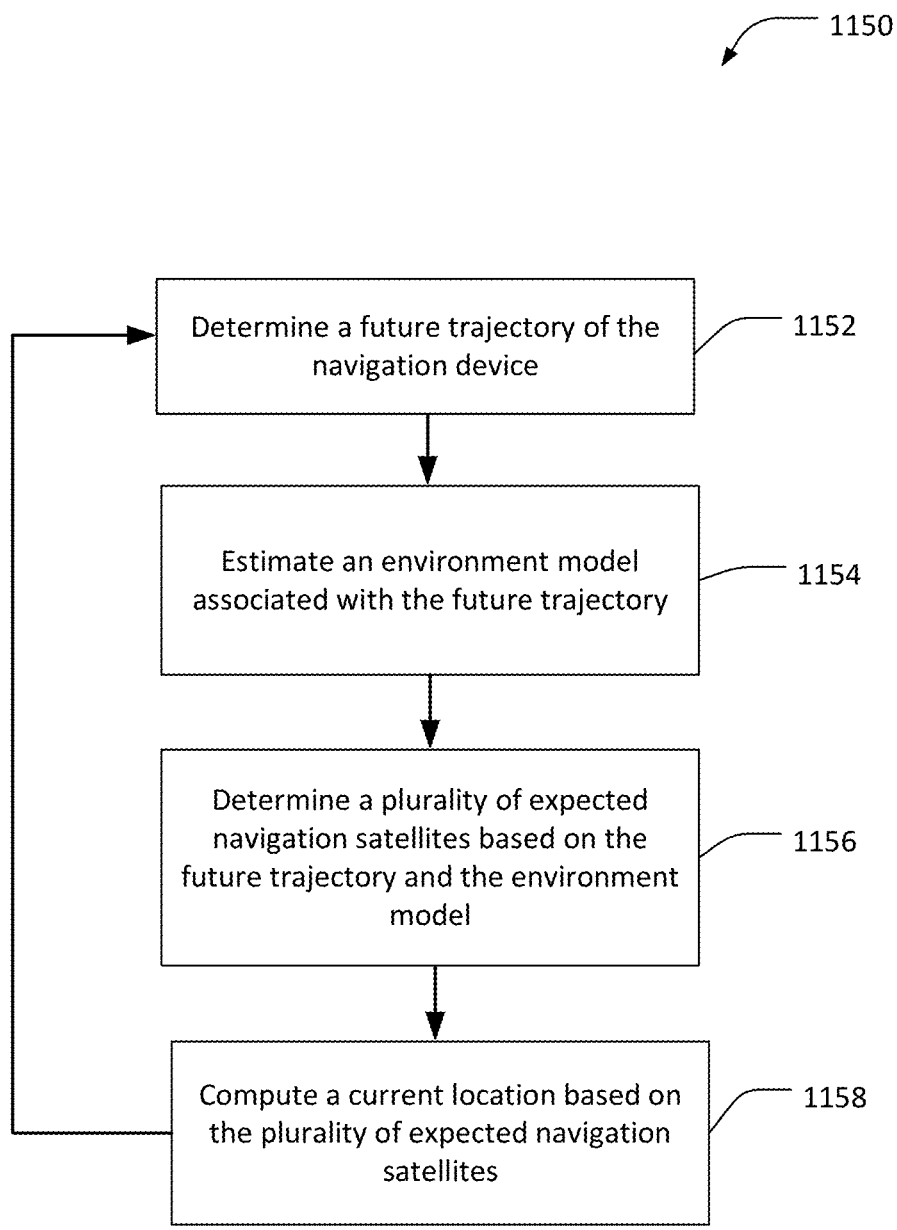
FIG. 11B is an example process flow for determining a current location based on expected navigation satellites.

Referring to FIG. 11B, with further reference to FIG. 5, a method 1150 for determining a current location based on expected navigation satellites is shown. The method 1150 is, however, an example and not limiting. The method 1150 may be altered, e.g., by having stages added, removed, rearranged, combined, performed concurrently, and/or having single stages split into multiple stages.

At stage 1152, the method includes determining a future trajectory of the navigation device. In an example, the PE 156 in the UE 100 may be a means for determining a future trajectory. In an autonomously driving vehicle, a path planning module may be used to determine the future trajectory. The future trajectory is a function of time and position. In an example, input from the sensors 185 may provide vehicle state information such as speed and direction and the memory 130 may include mapping information. The combination of vehicle state information and map data may be used to determine the trajectory. As an example, the trajectory 520a leads to the future location 520 (i.e., the second location at a second time {t2, p2}).

At stage 1154, the method includes estimating an environment model associated with the future trajectory. In an example, the memory 130 and or optical sensors/camera(s) 180 may be means for estimating an environment model. The environment models may represent a 3-D environment of a location based on previously determined 3-D map data stored in the memory 130 or received via the LADP 158 data link layer. The 3-D map data may include information indicating the obstructed elevation and azimuth angles along the trajectory 520a including the approach, transiting, and exiting the future location 520. In an example, an optical sensors/camera(s) 180 may include a forward-facing camera on the vehicle 510 such as the camera 511. The CVP 155 may be configured to obtain images from the camera 511 and input from the sensors 185 to solve structure-from-motion problems to estimate the 3-D environment. In an example, combinations of 3-D map data and images obtained from the camera 511 may be used to estimate the 3-D environment.

At stage 1156, the method includes determining a plurality of expected navigation satellites (e.g., space vehicles (SVs)) based on the future trajectory and the environment model. In an example, the processor(s) 150 may be a means for determining the plurality of expected navigation satellites. The LADP 158 may be configured to process location assistance information including visibility map assistance information, updated GNSS satellite almanac and/or ephemeris information, which may then be used by the processor(s) 150 with the environment model information to select a signal acquisition/measurement strategy and/or determine a location. The visibility map may be filtered based on the unobstructed elevation and azimuth angles associated with the environment model. The available set of SVs based on the ephemeris data may be limited to SVs that will remain visible (i.e., not obstructed) by the environment at the time(s) the navigation device will be proximate to, or within, the area of the environment.

At stage 1158, the method includes computing a current location based on the plurality of expected navigation satellites. In an example, the processor(s) 150 and the GNSS receiver 140 may be a means for computing a current location. The navigation satellites currently in use may be a starting set for the expected navigation satellites. That is, in an example, preference may be given to the navigation satellites which will be visible in the 3-D environment during the predicted future trajectory determined at stage 1152. Other known navigation selection criteria, such as ionospheric estimates or other methods to reduce the dilution of precision, may also be used to determine the set of navigation satellites. The navigation filters in the GNSS receiver 140 may be configured based on the variables associated with the expected navigation satellites. The LADP 158 may be configured to process location assistance information comprising updated GNSS satellite almanac and/or ephemeris information, which may then be used by the processor(s) 150 with the signals received by the GNSS receiver 140 to determine a current location. The method 1150 can iterate back to stage 1152 such that the environment model and the corresponding navigation satellite selection may be updated on a periodic or on a near continual basis.

Figure 12:
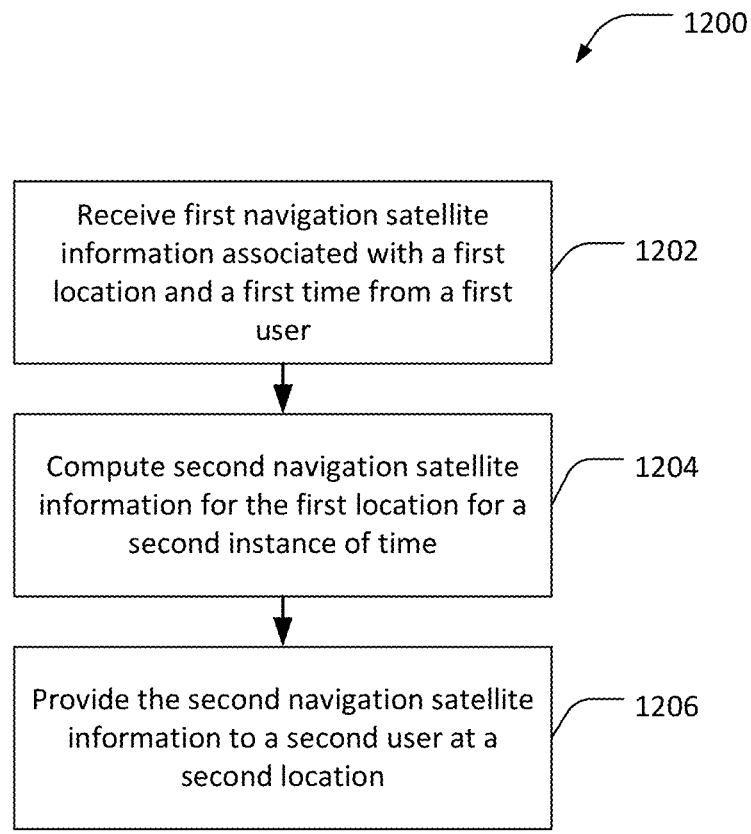
FIG. 12 is an example process flow for network assisted satellite selection.

Referring to FIG. 12, with further reference to FIG. 7, a method 1200 for determining a current location based on map-aided satellite selection is shown. The method 1200 is, however, an example and not limiting. The method 1200 may be altered, e.g., by having stages added, removed, rearranged, combined, performed concurrently, and/or having single stages split into multiple stages.

At stage 1202, the method includes receiving first navigation satellite information associated with a first location and a first time from a first user. In an example, the base station 602 and the server 250 are means for receiving the navigation satellite information. In an example, a user such as the second vehicle 710 may be at a location (e.g., the position {p2}) at a first time {t1}. A GNSS receiver 140 on the second vehicle 710 may be tracking one or more navigation satellites (SVs) in a 3-D environment such as an urban or natural canyon. The second vehicle 710 may have previously determined the visible SVs which are not obstructed by the canyon. The second vehicle 710 may send SV information associated with this current set of SVs to the base station 602 via the communication link 704. The SV information may include SV identification and signal strength (e.g., SNR) data. In an example, the SV information sent by the second vehicle 710 and received by the server 250 may include fields in the data structure 1000. The server 250 may be configured to store the received SV information in one or more local or remote memory devices (e.g., non-volatile memory such as hard disks, etc.).

At stage 1204, the method includes computing second navigation satellite information for the first location for a second instance of time. The server 250 may be a means for computing the second navigation satellite information. The server 250 may utilize the navigation satellite information received at stage 1202 and ephemeris data associated with the received navigation satellite information to determine elevation and azimuth angles for those navigation satellites at the same position for a second instance of time (i.e., {t2, p2}). In an example, the first position and the second instance of time correspond to a location on a trajectory of a second user. The server 250 may be configured to utilize 3-D information associated with the first location to compute the second navigation satellite information. That is, the server 250 may exclude navigation satellites from the second navigation satellite information that are not visible due to obstructions at the first location.

At stage 1206, the method includes providing the second navigation satellite information to a second user at a second location. The base station 602 and the wireless communication link 604 may be means for providing the second navigation satellite information. The second navigation satellite information may be received by a UE 100 operated by the second user (i.e., the first vehicle 510) and used to determine a current position along a trajectory towards the first location (i.e., {p2}). In an example, the second user may apply 3-D map information that is stored in the UE 100, or obtained via a camera, to select a subset of the second navigation information to be used for obtaining positioning signals.

Figure 13:
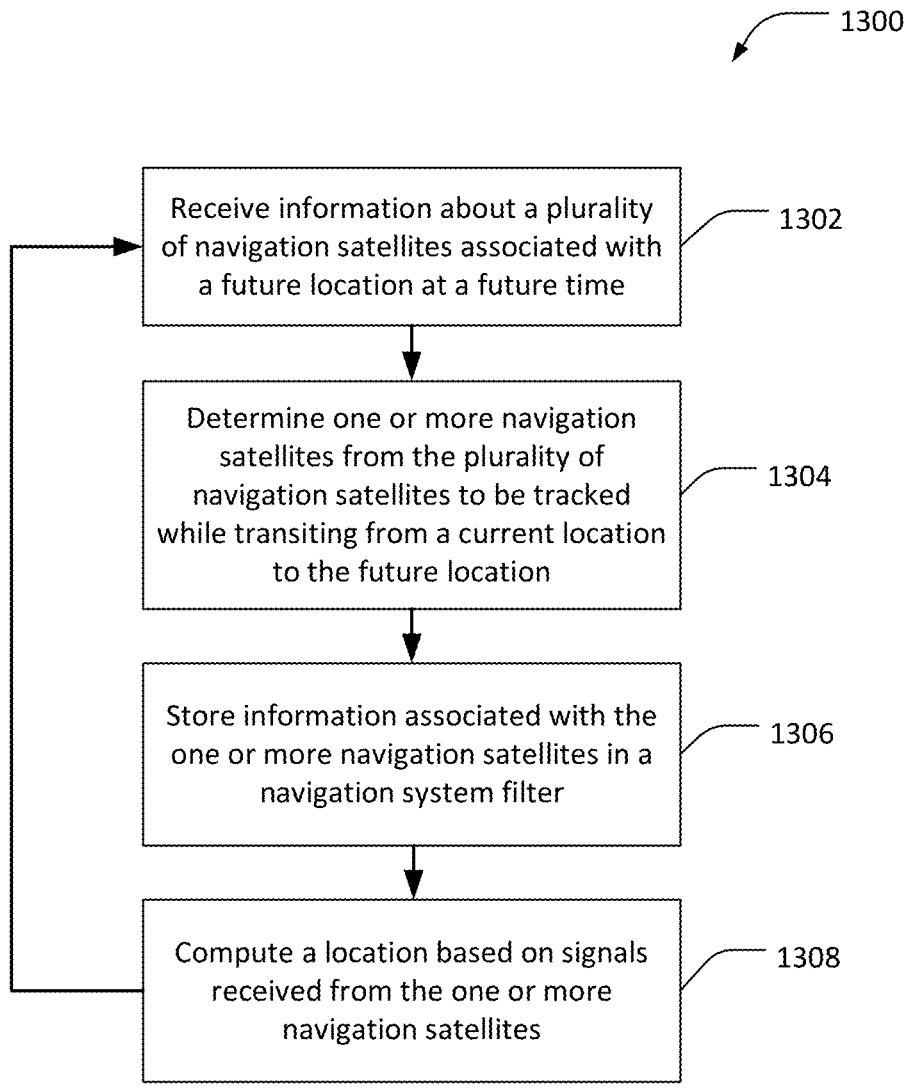
FIG. 13 is an example process flow for tracking satellites based on a future location.

Referring to FIG. 13, with further reference to FIG. 7, a method 1300 for tracking satellites based on future locations is shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving information about a plurality of navigation satellites associated with a future location at a future time. A UE 100, such as in the first vehicle 510, may be a means for receiving the information about a plurality of navigation satellites. In an example, the navigation satellite information about a future location and a future time (i.e., the second position {p2} at a future time {t2}) may be received from the server 250 via the base station 602. In another example, the navigation satellite information may be received from the second vehicle 710 via the DSRC comm link 706. The navigation satellite information may include SV identification information and indications of signal strength. The UE 100 may be configured to determine elevation and azimuth data associated with navigation satellite information. In an example, the received navigation satellite information may include elevation and azimuth information associated with the navigation satellites (i.e., SVs).

At stage 1304, the method includes determining one or more navigation satellites from the plurality of navigation satellites to be tracked while transiting from a current location to a future location. The LADP 158 may be a means for determining one or more navigation satellites to be tracked. The first vehicle 510 may utilize the received navigation satellite information to determine which of the navigation satellites will be visible as the first vehicle 510 proceeds along the trajectory 520*a*. The determination of which navigation satellites will be visible may be modified based on environment model data along the trajectory 520*a*. As discussed, environment model data, such as 3-D map data, may be received from a networked resource (e.g., the server 250), stored locally in the UE (e.g., the memory 130), or determined based on images from a forward looking camera 511 or other mapping sensors (e.g., LIDAR). Priority may be given to the navigation satellites which will be continuously visible throughout a significant majority (e.g., 90%) of the predicted trajectory 520*a*.

At stage 1306, the method includes storing information associated with the one or more navigation satellites in a navigation filter. The GNSS receiver 140 may be a means for storing navigation satellite information in a navigation system filter. The navigation system filter in a GNSS system is typically an extended Kalman filter. The information associated with the navigation satellites in a navigation filter typically includes satellite clock offset and drift, orbital parameters, carrier wave integer ambiguity estimates, solar radiation pressure parameters, biases of the monitoring stations clock, tropospheric effects, and earth rotational components. Since each tracked navigation satellites may consume memory and processing cycles, tracking a large number of navigation satellites can consume the computing processes (and battery power) of the UE 100. Conversely, limiting the number of navigation satellites to be tracked may significantly reduce the computational load on the UE 100.

At stage 1308, the method includes computing a location based on signals received from the one or more navigation satellites. The LADP 158 and the GNSS receiver 140 may be a means for computing a location. The navigation filters in the GNSS receiver 140 may be configured based on the stored variables associated with the set of navigation satellites determined at stage 1306. The LADP 158 is configured to process location assistance information comprising updated GNSS satellite almanac and/or ephemeris information, which may then be used by the processor(s) 150 with the signals received by the GNSS receiver 140 to determine a current location. The method 1300 can iterate back to stage 1302 such that navigation satellite information associated with future locations may be updated on a periodic or at a near continual basis.

Figure 14:
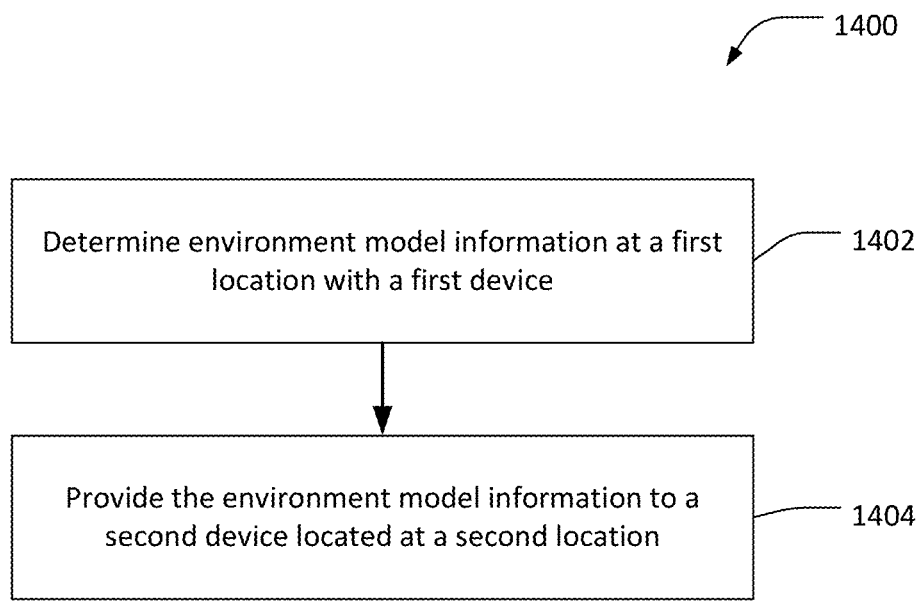
FIG. 14 is an example process flow for crowdsourcing environment model information.

Referring to FIG. 14, with further reference to FIG. 9, a method 1400 for crowdsourcing environment model information is shown. The method 1400 is, however, an example and not limiting. The method 1400 may be altered, e.g., by having stages added, removed, rearranged, combined, performed concurrently, and/or having single stages split into multiple stages.

At stage 1402, the method includes determining environment model information at a first location with a first device. The UE 100 may be a means for determining environment model information. In a first example, the optical sensor(s)/camera(s) 180 may obtain one or more images of an area and the CVP 155 may be configured to determine clear areas and obstructed areas based on the images. The environment model information may include dimensions (e.g., height above ground) and locations of the detected obstacles (i.e., objects causing the obstruction). In an example, the environment model information may include an indication of a location and the elevation angles and azimuth angles that are obstructed. Other 3-D modeling data formats may also be used as the environment model. In another example, the GNSS receiver 140 may be configured to capture signal strength information (e.g., SNR) for potentially visible SVs. The signal strength information may be used to determine locations of the obstacles because the obstructed signal paths (or multipath signals) may have a lower signal strength than the SVs with an unobstructed line of site. In a crowdsourcing application, such SV signal information may be used to generate environment models (e.g., 2-D and 3-D models) for map-aided GNSS selection as provided herein.

At stage 1404, the method includes providing the environment model information to a second device located at a second location. The transceiver 110, base station 602 and the wireless communication link 604, and the DSRC comm link 706 may be means of providing the environment model information. In an example, the environment model information may be 3-D model information including landscape and/or building parameters such as centroid size/location and height dimension. The environment model information may be an indication of obstructed or clear elevation angles and azimuth angles for a location or trajectory. For example, in an urban canyon, the elevation and azimuth angles may assume standard building heights as the border of the canyon for the length of a trajectory. The environment model information may be used by the second device to determine a set of SVs to utilize on a trajectory to from the second location to the first location. In a crowdsourced application, the server 250 may be the second device. The server 250 may aggregate environment model information received from multiple devices and ephemeris data to compute SVs for future trajectories. Networked devices may query the server 250 with a trajectory indicating locations and times to receive a set of SVs to track.

Figure 15:
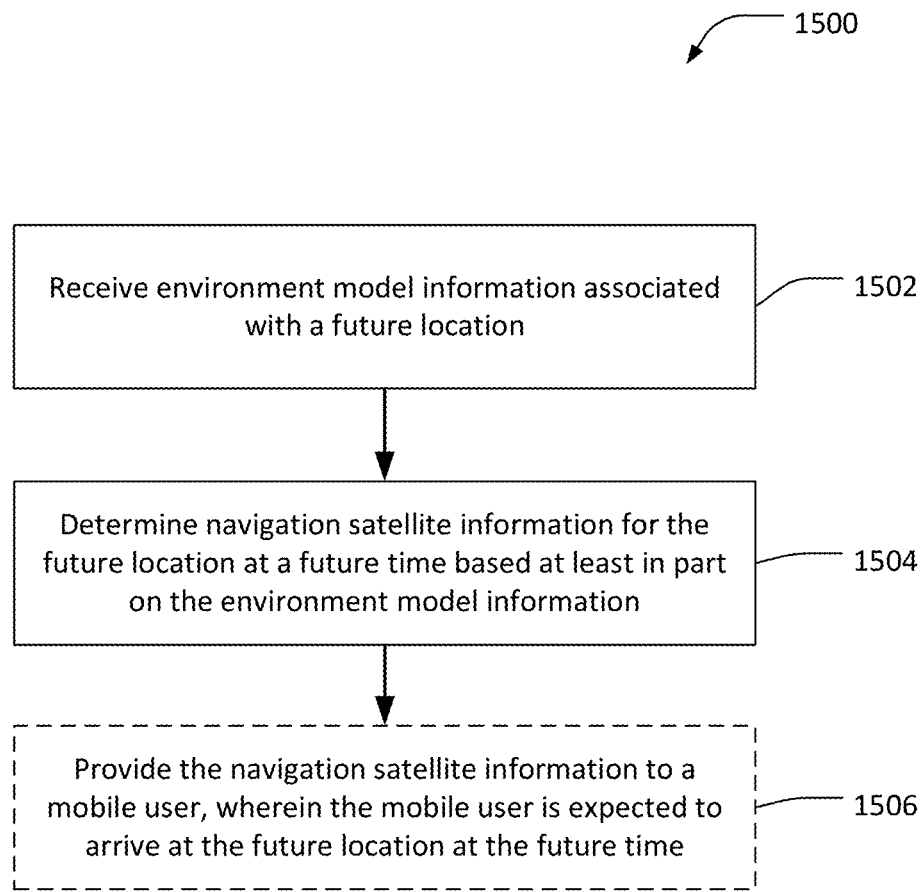
FIG. 15 is an example process flow for determining navigation satellite information based on received environment model information.

Referring to FIG. 15, with further reference to FIG. 9, a method 1500 for determining navigation satellite information based on received environment model information is shown. The method 1500 is, however, an example and not limiting. The method 1500 may be altered, e.g., by having stages added, removed, rearranged, combined, performed concurrently, and/or having single stages split into multiple stages. For example, providing navigation satellite information at stage 1506 is optional and may be performed based on a future request from a mobile user.

At stage 1502, the method includes receiving environment model information associated with a future location. The server 250, or the UE 100 in a first vehicle 510, may be a means for receiving the environment model information. In an example, the environment model information may be obtained by local sensors, such as the camera 711 on the second vehicle 710 in FIG. 9 as previously discussed. In another example, the environment model information may be previously computed environment model information stored on a network resource and available via an application programming interface (API) or other data transfer application. The server 250 may be configured to receive the environment models by an API call including information associated with the future location (e.g., displacement from current position, latitude/longitude, coordinates, etc.).

At stage 1504, the method includes determining navigation satellite information for the future location at a future time based at least in part on the environment model information. The server 250 or the UE 100 may be a means for determining the navigation satellite information. In an example, the server 250 may have access to navigation satellite ephemeris data and may be configured to determine elevation and azimuth angles for the navigation satellites at the future location at a future time. The elevation and azimuth angles may be compared to obstructed areas created by the environment model information and a set of visible navigation satellites may be generated. In an example, the future time may be based on a request received from a vehicle traveling along a trajectory leading to the future location at the future time. In an example, the server 250 may include a vehicle supervisor application and may be configured to determine future locations and future times for a plurality of vehicles on a periodic basis.

At stage 1506, the method optionally includes providing the navigation satellite information to a mobile user, wherein the mobile user is expected to arrive at the future location at the future time. The base station 602 and the wireless communication link 604 may be a means for providing the navigation satellite information. In an example, the mobile user may be a UE 100 proceeding along a trajectory towards the future location. The UE 100 may query the server 250 with location and time information associated with the trajectory and receive the navigation satellite information in a response. The navigation satellite information may include a list of navigation satellites and related tracking data, and the GNSS receiver 140 may be configured to load the appropriate tracking data into the navigation filter. The UE 100 may be configured to give priority to navigation satellites that are currently visible and may be tracked along the entire trajectory.

Figure 16:
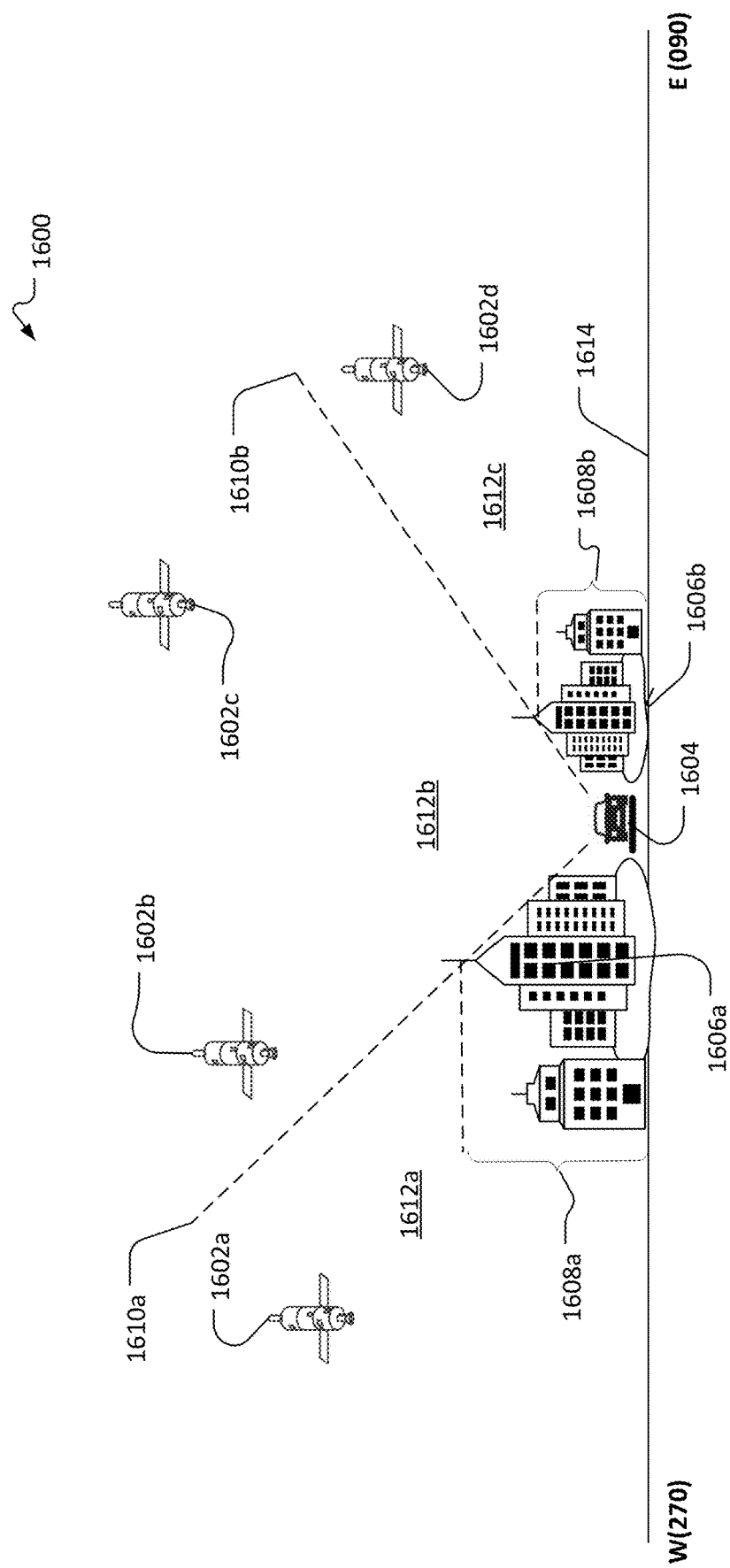
FIG. 16 is an illustration including examples of clear and obstructed elevations in an urban canyon.

Referring to FIG. 16, examples of clear and obstructed elevations in an urban canyon scenario 1600 are shown. The scenario 1600 includes a plurality of navigation satellites (SVs) 1602a-d, a vehicle 1604, west side buildings 1606a, and east side buildings 1606b. The number of navigation satellites is an example. In operation, 10-40 navigation satellites may be in the sky above the urban canyon. The vehicle 1604 includes a UE 100 and is proceeding south through the urban canyon between the west side buildings 1606a and the east side buildings 1606b. FIG. 16 is presented from a southern view with East (i.e., azimuth 090) on the right, and West (i.e., azimuth 270) on the left. A west side height dimension 1608a represents the maximum height of the west side buildings 1606a, and an east side height dimension 1608b represents the maximum height of the east side buildings 1608b. In an example, mean, medium, or other statistical values based on a plurality of building heights may be used for the height dimensions 1608a-b. The locations of the buildings 1606a-b, the heights 1608a-b and the location of the vehicle relative to the buildings 1606a-b may be used to determine a west side line-of-sight (LOS) limit 1610a and an east side line-of-sight (LOS) limit 1610b. The building heights 1608a-b and locations may be obtained from environment model information such as 3-D map data or images obtained by the UE 100 as previously described. In general, the LOS limits 1610a-b are elevation angles associated with respective azimuth angle or range of azimuth angles (e.g., 090+/−10 degrees, 270+/−10 degrees). The LOS limits 1610a-b define obstructed and unobstructed areas of the sky. For example, a first obstructed area 1612a is defined by the elevation angles between the west side LOS limit 1610a and the ground 1614, and a second obstructed area 1612c is defined by the elevation angles between the east side LOS limit 1610b and the ground 1614. An unobstructed area 1612b (i.e., a clear view) is defined as the elevation angles between the LOS limits 1610a-b. In this example, a first navigation satellite 1602a and a fourth navigation satellite 1602d are obstructed, while a second navigation satellite 1602b and a third navigation satellite 1602c are unobstructed. The number of LOS limits 1610a-b, and the obstructed/unobstructed areas 1612a-c, are examples as an urban canyon may have buildings at multiple azimuths and thus the LOS limits may be more of a conic section or other shape based on the heights for the surrounding buildings.

Figure 17:
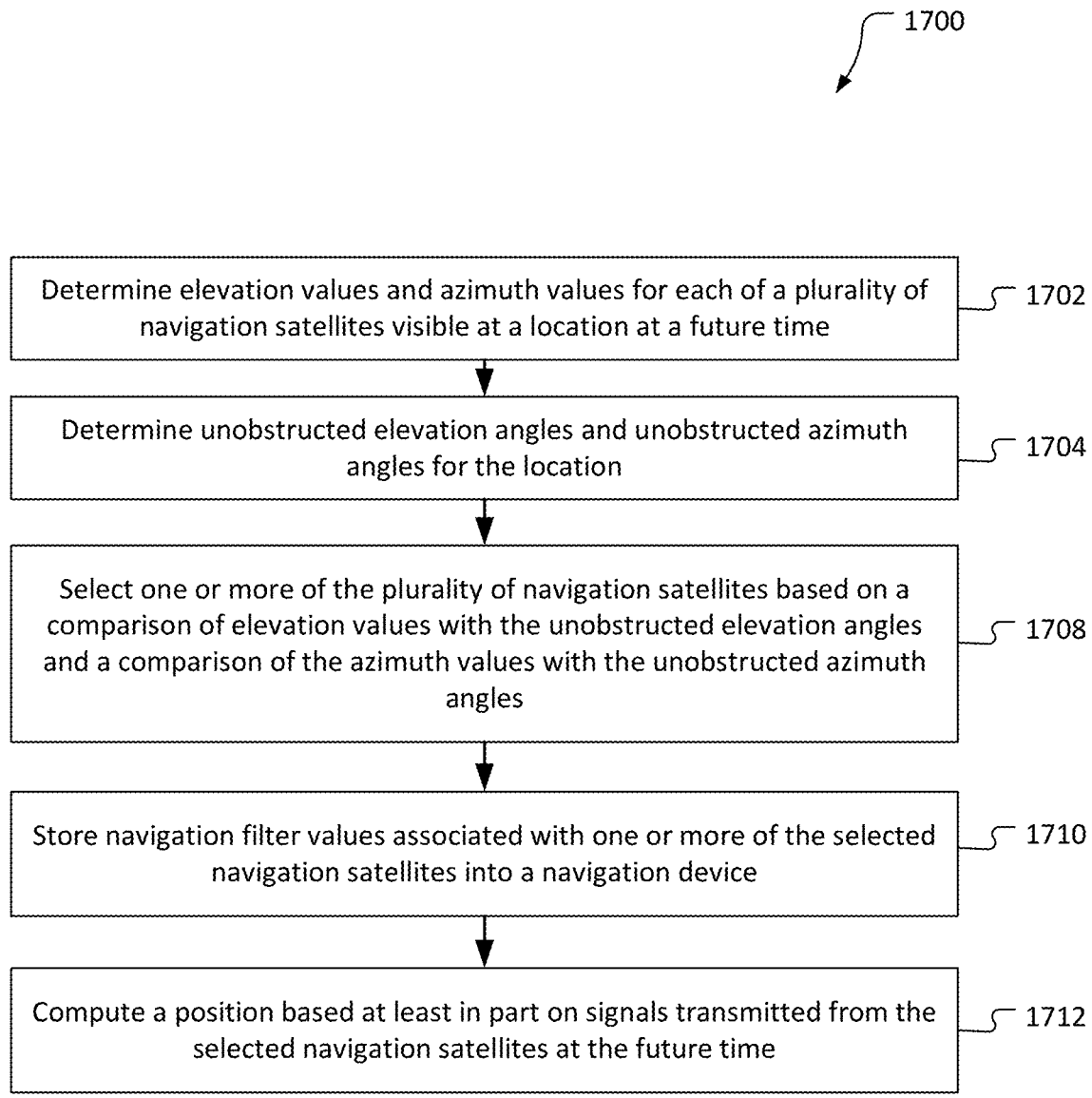
FIG. 17 is an example process for selecting navigation satellites based on environment model information.

Referring to FIG. 17, with further reference to FIG. 16, a method 1700 for selecting navigation satellites based on environment model information is shown. The method 1700 is, however, an example and not limiting. The method 1700 may be altered, e.g., by having stages added, removed, rearranged, combined, performed concurrently, and/or having single stages split into multiple stages.

At stage 1702, the method includes determining elevation values and azimuth values for each of a plurality of navigation satellites (e.g., space vehicles (SVs)) visible at a location at a future time. The processor 150 may be configured to determine elevation and azimuth values. In various embodiments, elevation and azimuth values may be determined in hardware, software, and/or a combination thereof. In an embodiment, for example, elevation and azimuth values may be determined by the LADP 158 which may be implemented in hardware, software, and or a combination thereof. For example, the LADP 158 may include ephemeris data and may be configured to determine which navigation satellites should be visible at a location and a time and the corresponding elevation and azimuth angles for each of the navigation satellites.

At stage 1704, the method includes determining unobstructed elevation angles and unobstructed angles for the location. The processor 150 may be configured to determine unobstructed elevation angles and unobstructed angles for the location. In various embodiments, elevation angles and unobstructed angles may be determined in hardware, software, and/or a combination thereof. In an embodiment, for example, unobstructed elevation angles and unobstructed angles for the location may be determined by the LADP 158 which may be implemented in hardware, software, and or a combination thereof. The LADP 158 and the memory 130 may be a means for determining the unobstructed angles. The memory 130 may include environment models, such as 3-D map information, obtained from map data or the result of image processing in the CVP 155. The environment models may include building, or other obstruction, location and height information 1608a-b. The LADP 158 may utilize an estimated future location relative to the environment model information to determine one or more LOS limits 1610a-b based on the obstruction locations and heights. The unobstructed elevation and azimuth angles may be elevation angles that are above and between the LOS limits 1610a-b for one or more associated azimuth angles, such as the unobstructed area 1612b.

At stage 1708, the method includes selecting one or more of the plurality of navigation satellites based on a comparison of elevation values with the unobstructed elevation angles and a comparison of the azimuth values with the unobstructed azimuth angles. The processor 150 may be configured to select one or more of the plurality of navigation satellites based on a comparison of elevation values with the unobstructed elevation angles and a comparison of the azimuth values with the unobstructed azimuth angles. In various embodiments, the one or more of the plurality of navigation satellites may be selected based on hardware, software, and/or a combination thereof. In an embodiment, for example, the one or more of the plurality of navigation satellites may be selected by the LADP 158 which may be implemented in hardware, software, and or a combination thereof. The LADP 158 may be a means for selecting one or more of the plurality of navigation satellites. For example, the first navigation satellite 1602a is at azimuth near 270 and at an elevation angle that is less than the west side LOS limit 1610a. Thus, the comparison would indicate that the first navigation satellite 1602a is obstructed and it would not be selected. In contrast, the second navigation satellite 1602b is at an azimuth near 270 and is at an elevation angle that is greater than the west side LOS limit 1610a. Thus, the comparison would indicate that the second navigation satellite 1602b is unobstructed and it would be selected. Similar comparisons may be made for each of the navigation satellites determined at stage 1702 and each of the unobstructed elevation and azimuth angles determined at stage 1704.

At stage 1710, the method includes storing navigation filter values associated with one or more of the selected navigation satellites into a navigation device. The GNSS receiver 140 is a means for storing navigation filter values. The GNSS receiver 140 will typically include an extended Kalman filter to integrate satellite measurements across time. In particular, the navigation filter is used to track integer ambiguities for each of the selected navigation satellites. The LADP 158 may be configured to provide other navigation filter values to the GNSS receiver 140, such as vehicle position and velocity and other variables used to track the SVs.

At stage 1712, the method includes computing a position based at least in part on signals transmitted from the selected navigation satellites at the future time. The GNSS receiver 140 and the processor 150 may be means for computing a position. For example, the LADP 158 may be configured to process location assistance information comprising updated GNSS satellite almanac and/or ephemeris information, which may then be used by the processor(s) 150 with the signals received by the GNSS receiver 140 to compute a position. While the process 700 provides for selecting navigation satellites based on environment model information, computing a position at stage 1712 may also utilize other satellite and terrestrial information available to the UE 100. For example, the pseudo range information associated with obstructed navigation satellites (e.g., signals with lower SNR) may be used. Other positioning techniques utilizing other technologies such as Wi-Fi and WAN signals, camera/image-based navigation, and vehicle-based LIDAR and RADAR systems may also be used for computing a position.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

Implementation examples are described in the following numbered clauses:

1. A method for determining a current location with a user equipment, comprising:
   determining a future trajectory of the user equipment;
   estimating an environment model associated with the future trajectory;
   determining a plurality of expected navigation satellites based on the future trajectory and the environment model;
   selecting a set of navigation satellites to use in computing the current location based in part on the plurality of expected navigation satellites; and
   computing the current location based on the selected set of navigation satellites.

2. The method of clause 1 wherein estimating the environment model includes obtaining map data associated with the future trajectory from memory.

3. The method of clause 1 wherein estimating the environment model includes obtaining map data associated with the future trajectory from a server.

4. The method of clause 1 wherein estimating the environment model includes obtaining one or more images of objects along the future trajectory and solving a structure-from-motion problem to reconstruct a three-dimensional environment model.

5. The method of clause 1 wherein determining the future trajectory of the user equipment includes obtaining a current velocity and a current heading of the user equipment.

6. The method of clause 1 wherein determining the future trajectory of the user equipment includes obtaining map data associated with the future trajectory and combining a current velocity of the user equipment with the map data.

7. The method of clause 1 wherein determining the future trajectory of the user equipment includes obtaining the future trajectory from a path planning module of an autonomously driving vehicle.

8. The method of clause 1 further comprising determining a plurality of current navigation satellites with the user equipment, and selecting the set of navigation satellites to use in computing the current location based in part on the plurality of current navigation satellites and the plurality of expected navigation satellites.

9. The method of clause 1 wherein selecting the set of navigation satellites to use in computing the current location includes selecting one or more navigation satellites that will not be obstructed for at least a portion of the future trajectory.

10. The method of clause 1 wherein selecting the set of navigation satellites to use in computing the current location includes selecting one or more navigation satellites vehicles that will not be obstructed for a significant majority of the future trajectory.

11. The method of clause 1 further comprising storing an integer ambiguity value for each of the navigation satellites in the set of navigation satellites to use in computing the current location in a navigation filter in the user equipment.

12. A navigation device, comprising:
    a memory;
    a global navigation satellite system receiver;
    at least one processor operably coupled to the memory and the global navigation satellite system receiver and configured to:
    determine a future trajectory of the navigation device;
    estimate an environment model associated with the future trajectory;
    determine a plurality of expected navigation satellites based on the future trajectory and the environment model;
    select a set of navigation satellites to use in computing a current location based in part on the plurality of expected navigation satellites; and
    compute the current location based on signal received by the global navigation satellite system receiver received from the set of navigation satellites.

13. The navigation device of clause 12 wherein the at least one processor is further configured to obtain map data associated with the future trajectory from the memory to estimate the environment model.

14. The navigation device of clause 12 further comprising at least one transceiver operably coupled to the at least one processor and configured to communicate with a wireless network, wherein the at least one processor is further configured to obtain map data associated with the future trajectory from a server to estimate the environment model.

15. The navigation device of clause 12 further comprising a camera operably coupled to the at least one processor and configured to obtain one or more images of objects along the future trajectory, and the at least one processor is further configured to solve a structure-from-motion problem based in part on the one or more images of objects obtained by the camera, wherein estimating the environment model includes a solution to the structure-from-motion problem.

16. The navigation device of clause 12 further comprising an inertial measurement unit operably coupled to the at least one processor and configured to detect a velocity measurement and a heading measurement, wherein the at least one processor is further configured to obtain a current velocity and a current heading from the inertial measurement unit to determine the future trajectory of the navigation device.

17. The navigation device of clause 16 wherein the at least one processor is further configured to determine the future trajectory of the navigation device by combining the current velocity with map data stored in the memory.

18. The navigation device of clause 12 wherein the at least one processor configured to determine the future trajectory of the navigation device is configured to obtain the future trajectory from a path planning module of an autonomously driving vehicle.

19. The navigation device of clause 12 wherein the global navigation satellite system receiver configured to determine a plurality of current navigation satellites, and the at least one processor is further configured to select the set of navigation satellites to use in computing the current location based on part on the plurality of current navigation satellites and the plurality of expected navigation satellites.

20. The navigation device of clause 12 wherein the at least one processor is configured to determine the set of navigation satellites to use in computing the current location by determining one or more navigation satellites that will not be obstructed for at least a portion of the future trajectory.

21. The navigation device of clause 12 wherein the at least one processor is configured to determine the set of navigation satellites to use in computing the current location by determining one or more navigation satellites that will not be obstructed for a significant majority of the future trajectory.

22. The navigation device of clause 12 wherein the global navigation satellite system receiver is configured to store an integer ambiguity value for each of the navigation satellites in the set of navigation satellites to use in computing the current location in a navigation filter.

23. An apparatus for determining a current location, comprising:
    means for determining a future trajectory of the apparatus;
    means for estimating an environment model associated with the future trajectory;
    means for determining a plurality of expected navigation satellites based on the future trajectory and the environment model;
    means for selecting a set of navigation satellites to use in computing the current location based in part on the plurality of expected navigation satellites; and
    means computing the current location based on the selected set of navigation satellites.

24. The apparatus of clause 23 wherein the means for estimating the environment model includes means for obtaining map data associated with the future trajectory from memory.

25. The apparatus of clause 23 wherein the means for estimating the environment model includes means for obtaining map data associated with the future trajectory from a server.

26. The apparatus of clause 23 wherein the means for estimating the environment model includes means for obtaining one or more images of objects along the future trajectory and means for solving a structure-from-motion problem to reconstruct a three-dimensional environment model.

27. The apparatus of clause 23 wherein the means for determining the future trajectory of the apparatus includes means for obtaining map data associated with the future trajectory and means for combining a current velocity of the apparatus with the map data.

28. The apparatus of clause 23 wherein the means for determining the future trajectory of the apparatus includes means for obtaining the future trajectory from a path planning module of an autonomously driving vehicle.

29. The apparatus of clause 23 wherein selecting the set of navigation satellites to use in computing the current location includes selecting one or more navigation satellites that will not be obstructed for at least a portion of the future trajectory.

30. A non-transitory processor-readable storage medium comprising computer-readable instructions configured to cause one or more processors to determine a current location with a user equipment, comprising:
    code for determining a future trajectory of the user equipment;
    code for estimating an environment model associated with the future trajectory;
    code for determining a plurality of expected navigation satellites based on the future trajectory and the environment model;
    code for selecting a set of navigation satellites to use in computing the current location based in part on the plurality of expected navigation satellites; and
    code for computing the current location based on the selected set of navigation satellites.

The invention claimed is:

1. A method for determining a current location with a user equipment, comprising:
    determining a future trajectory of the user equipment;
    receiving sensory information of at least one future location along the future trajectory;
    estimating a three-dimensional (3-D) environment model associated with the future trajectory utilizing the sensory information;
    determining a plurality of expected navigation satellites that are, based on the future trajectory and the (3-D) environment model, expected to be visible to the user equipment at the at least one future location;
    selecting a set of navigation satellites to use in computing the current location from the plurality of expected navigation satellites based at least in part on continuity of visibility of the same set of navigation satellites along the future trajectory; and
    computing the current location based on the selected set of navigation satellites.

2. The method of claim 1 wherein estimating the 3-D environment model includes obtaining map data associated with the future trajectory from memory.

3. The method of claim 1 wherein estimating the 3-D environment model includes obtaining map data associated with the future trajectory from a server.

4. The method of claim 1 wherein estimating the 3-D environment model includes obtaining one or more images of objects along the future trajectory and solving a structure-from-motion problem to reconstruct the 3-D environment model.

5. The method of claim 1 wherein determining the future trajectory of the user equipment includes obtaining a current velocity and a current heading of the user equipment.

6. The method of claim 1 wherein determining the future trajectory of the user equipment includes obtaining map data associated with the future trajectory and combining a current velocity of the user equipment with the map data.

7. The method of claim 1 wherein determining the future trajectory of the user equipment includes obtaining the future trajectory from a path planning module of an autonomously driving vehicle.

8. The method of claim 1 further comprising determining a plurality of currently visible navigation satellites with the user equipment, and selecting the set of navigation satellites to use in computing the current location such that the set of navigation satellites is in both the plurality of currently visible navigation satellites and the plurality of expected navigation satellites.

9. The method of claim 1 wherein selecting the set of navigation satellites to use in computing the current location includes selecting one or more navigation satellites that will not be obstructed for at least of two future locations along the future trajectory.

10. The method of claim 1 wherein selecting the set of navigation satellites to use in computing the current location includes selecting one or more navigation satellites that will not be obstructed for a significant majority of the future trajectory.

11. The method of claim 1 further comprising storing an integer ambiguity value for each of the navigation satellites in the set of navigation satellites to use in computing the current location in a navigation filter in the user equipment.

12. A navigation device, comprising:
a memory;
a global navigation satellite system receiver; and
at least one processor operably coupled to the memory and the global navigation satellite system receiver and configured to:
determine a future trajectory of the navigation device;
receive sensory information of at least one future location along the future trajectory;
estimate a three-dimensional (3-D) environment model associated with the future trajectory utilizing the sensory information;
determine a plurality of expected navigation satellites that are, based on the future trajectory and the (3-D) environment model, expected to be visible to the navigation device at the at least one future location;
select a set of navigation satellites to use in computing a current location from the plurality of expected navigation satellites based at least in part on continuity of visibility of the same set of navigation satellites along the future trajectory; and
compute the current location based on signal received by the global navigation satellite system receiver received from the set of navigation satellites.

13. The navigation device of claim 12 wherein the at least one processor is further configured to obtain map data associated with the future trajectory from the memory to estimate the (3-D) environment model.

14. The navigation device of claim 12 further comprising at least one transceiver operably coupled to the at least one processor and configured to communicate with a wireless network, wherein the at least one processor is further configured to obtain map data associated with the future trajectory from a server to estimate the (3-D) environment model.

15. The navigation device of claim 12 further comprising a camera operably coupled to the at least one processor and configured to obtain one or more images of objects along the future trajectory, and the at least one processor is further configured to solve a structure-from-motion problem based in part on the one or more images of objects obtained by the camera, wherein estimating the (3-D) environment model includes a solution to the structure-from-motion problem.

16. The navigation device of claim 12 further comprising an inertial measurement unit operably coupled to the at least one processor and configured to detect a velocity measurement and a heading measurement, wherein the at least one processor is further configured to obtain a current velocity and a current heading from the inertial measurement unit to determine the future trajectory of the navigation device.

17. The navigation device of claim 16 wherein the at least one processor is further configured to determine the future trajectory of the navigation device by combining the current velocity with map data stored in the memory.

18. The navigation device of claim 12 wherein the at least one processor configured to determine the future trajectory of the navigation device is configured to obtain the future trajectory from a path planning module of an autonomously driving vehicle.

19. The navigation device of claim 12 wherein the global navigation satellite system receiver configured to determine a plurality of currently visible navigation satellites, and the at least one processor is further configured to select the set of navigation satellites to use in computing the current location such that the set of navigation satellites is in both the plurality of currently visible navigation satellites and the plurality of expected navigation satellites.

20. The navigation device of claim 12 wherein the at least one processor is configured to determine the set of navigation satellites to use in computing the current location by determining one or more navigation satellites that will not be obstructed for at least two future locations along the future trajectory.

21. The navigation device of claim 12 wherein the at least one processor is configured to determine the set of navigation satellites to use in computing the current location by determining one or more navigation satellites that will not be obstructed for a significant majority of the future trajectory.

22. The navigation device of claim 12 wherein the global navigation satellite system receiver is configured to store an integer ambiguity value for each of the navigation satellites in the set of navigation satellites to use in computing the current location in a navigation filter.

23. An apparatus for determining a current location, comprising:
means for determining a future trajectory of the apparatus;
means for receiving sensory information of at least one future location along the future trajectory;
means for estimating a three-dimensional (3-D) environment model associated with the future trajectory utilizing the sensory information;
means for determining a plurality of expected navigation satellites that are, based on the future trajectory and the (3-D) environment model, expected to be visible to the apparatus at the at least one future location;
means for selecting a set of navigation satellites to use in computing the current location from the plurality of expected navigation satellites based at least in part on continuity of visibility of the same set of navigation satellites along the future trajectory; and
means computing the current location based on the selected set of navigation satellites.

24. The apparatus of claim 23 wherein the means for estimating the (3-D) environment model includes means for obtaining map data associated with the future trajectory from memory.

25. The apparatus of claim 23 wherein the means for estimating the (3-D) environment model includes means for obtaining map data associated with the future trajectory from a server.

26. The apparatus of claim 23 wherein the means for estimating the (3-D) environment model includes means for obtaining one or more images of objects along the future trajectory and means for solving a structure-from-motion problem to reconstruct the (3-D) environment model.

27. The apparatus of claim 23 wherein the means for determining the future trajectory of the apparatus includes means for obtaining map data associated with the future trajectory and means for combining a current velocity of the apparatus with the map data.

28. The apparatus of claim 23 wherein the means for determining the future trajectory of the apparatus includes means for obtaining the future trajectory from a path planning module of an autonomously driving vehicle.

29. The apparatus of claim 23 wherein selecting the set of navigation satellites to use in computing the current location includes selecting one or more navigation satellites that will not be obstructed for at least two future locations along the future trajectory.

30. A non-transitory processor-readable storage medium comprising computer-readable instructions configured to cause one or more processors to determine a current location with a user equipment, comprising:
    code for determining a future trajectory of the user equipment;
    code for receiving sensory information of at least one future location along the future trajectory;
    code for estimating a three-dimensional (3-D) environment model associated with the future trajectory utilizing the sensory information;
    code for determining a plurality of expected navigation satellites that are, based on the future trajectory and the (3-D) environment model, expected to be visible to the user equipment at the at least one future location;
    code for selecting a set of navigation satellites to use in computing the current location from the plurality of expected navigation satellites based at least in part on continuity of visibility of the same set of navigation satellites along the future trajectory; and
    code for computing the current location based on the selected set of navigation satellites.

* * * * *